(12) United States Patent
Chun

(10) Patent No.: US 12,096,346 B2
(45) Date of Patent: Sep. 17, 2024

(54) METHOD FOR SELECTING NETWORK IN WIRELESS COMMUNICATION SYSTEM

(71) Applicant: LG ELECTRONICS INC., Seoul (KR)

(72) Inventor: Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 557 days.

(21) Appl. No.: 17/420,502

(22) PCT Filed: Jan. 6, 2020

(86) PCT No.: PCT/KR2020/000172
§ 371 (c)(1),
(2) Date: Jul. 2, 2021

(87) PCT Pub. No.: WO2020/141956
PCT Pub. Date: Jul. 9, 2020

(65) Prior Publication Data
US 2022/0086743 A1    Mar. 17, 2022

(30) Foreign Application Priority Data

Jan. 4, 2019 (KR) .................. 10-2019-0001415
Apr. 26, 2019 (KR) .................. 10-2019-0049056

(51) Int. Cl.
*H04W 48/18* (2009.01)
*H04W 48/14* (2009.01)
*H04W 60/04* (2009.01)

(52) U.S. Cl.
CPC .......... *H04W 48/18* (2013.01); *H04W 48/14* (2013.01); *H04W 60/04* (2013.01)

(58) Field of Classification Search
CPC ...... H04W 48/18; H04W 48/14; H04W 60/04
See application file for complete search history.

(56) References Cited

U.S. PATENT DOCUMENTS

| | | |
|---|---|---|
| 2010/0216465 A1 | 8/2010 | Mubarek et al. |
| 2012/0100848 A1 | 4/2012 | Miklos |
| 2016/0212603 A1 | 7/2016 | Chen et al. |
| 2017/0164270 A1* | 6/2017 | Jiang ................ H04W 48/16 |

FOREIGN PATENT DOCUMENTS

KR    10-2014-0020181    2/2014

OTHER PUBLICATIONS

PCT International Search Report and Written Opinion in International Appln. No. PCT/KR2020/000172, dated Apr. 20, 2020, 5 pages.
3GPP, "3rd Generation Partnership Project; Technical Specification Group Core Network and Terminals; Non-Access-Stratum (NAS) functions related to Mobile Station (MS) in idle mode," Release 15; 3GPP TS 23.122 V15.6.0; Dec. 2018, 63 pages.

* cited by examiner

*Primary Examiner* — Kabir A Timory
(74) *Attorney, Agent, or Firm* — Fish & Richardson P.C.

(57) ABSTRACT

A method of selecting, by a user equipment (UE), a network for performing a registration in a wireless communication system is disclosed. The method includes checking a condition related to a connectivity state of the UE; selecting a first network included in a forbidden public land mobile network (PLMN) list based on the condition related to the connectivity state of the UE; transmitting, to the first network, a registration request message; and receiving, from the first network, a response message as a response to the registration request message.

8 Claims, 13 Drawing Sheets

[FIG. 1]
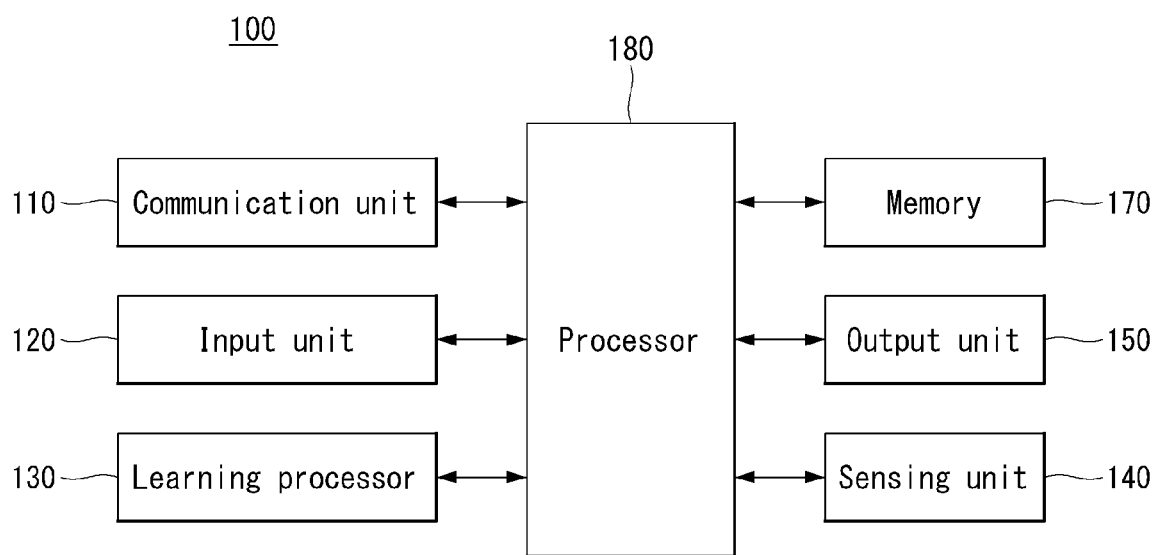
[FIG. 2]
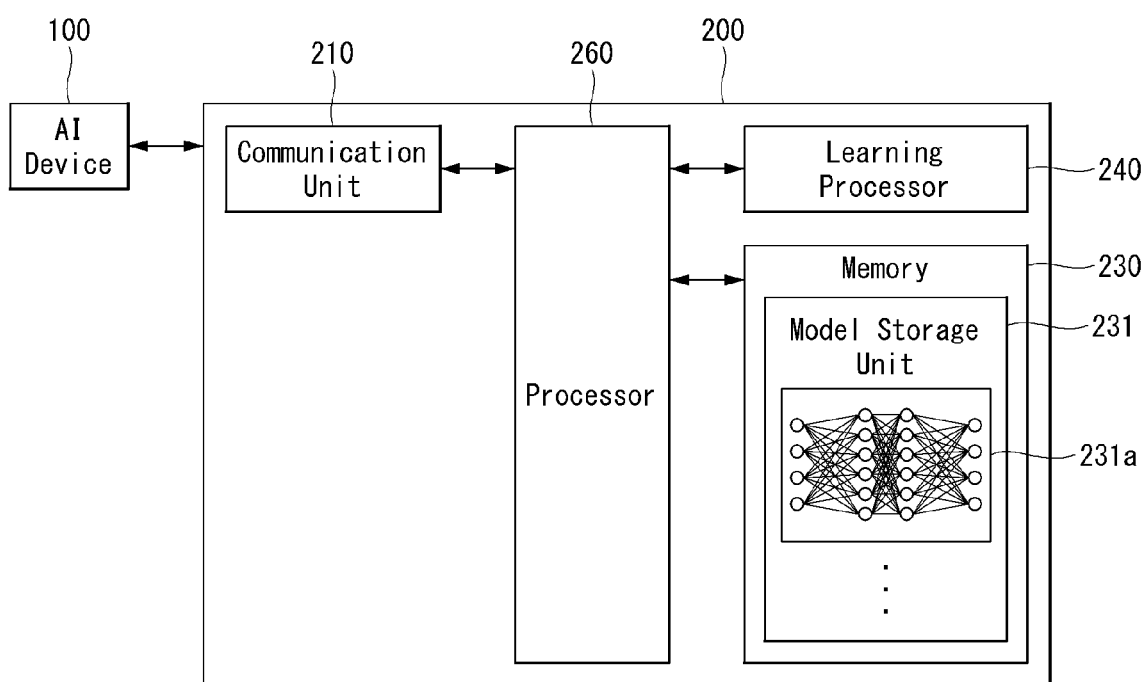

[FIG. 3]
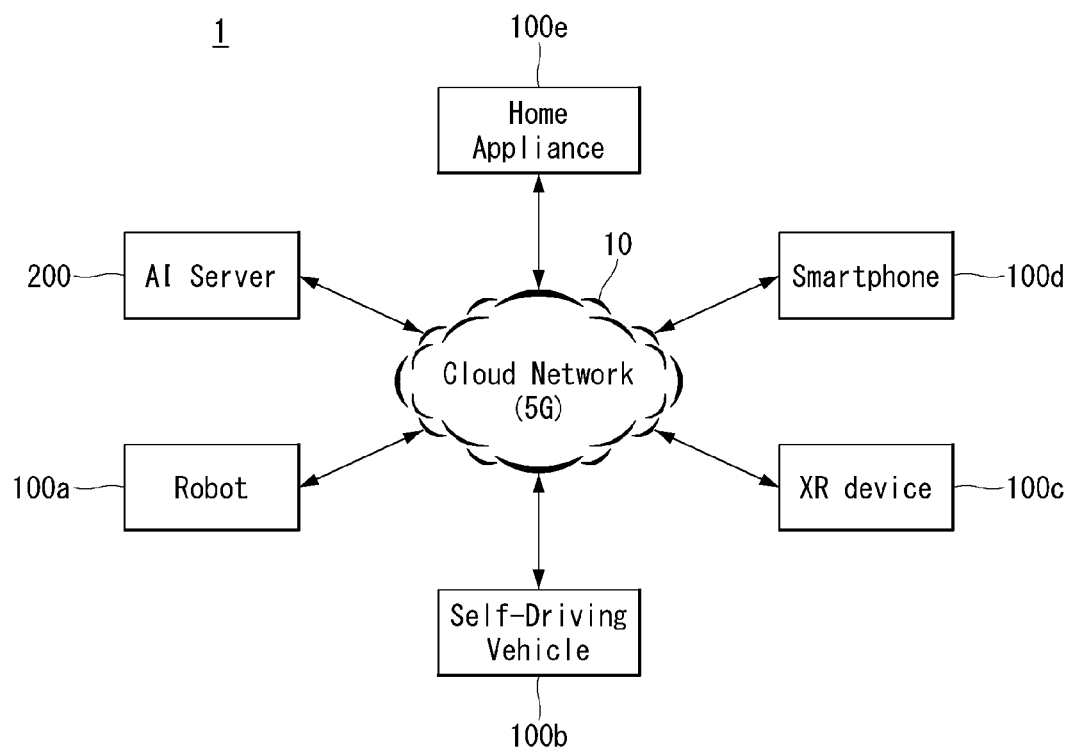

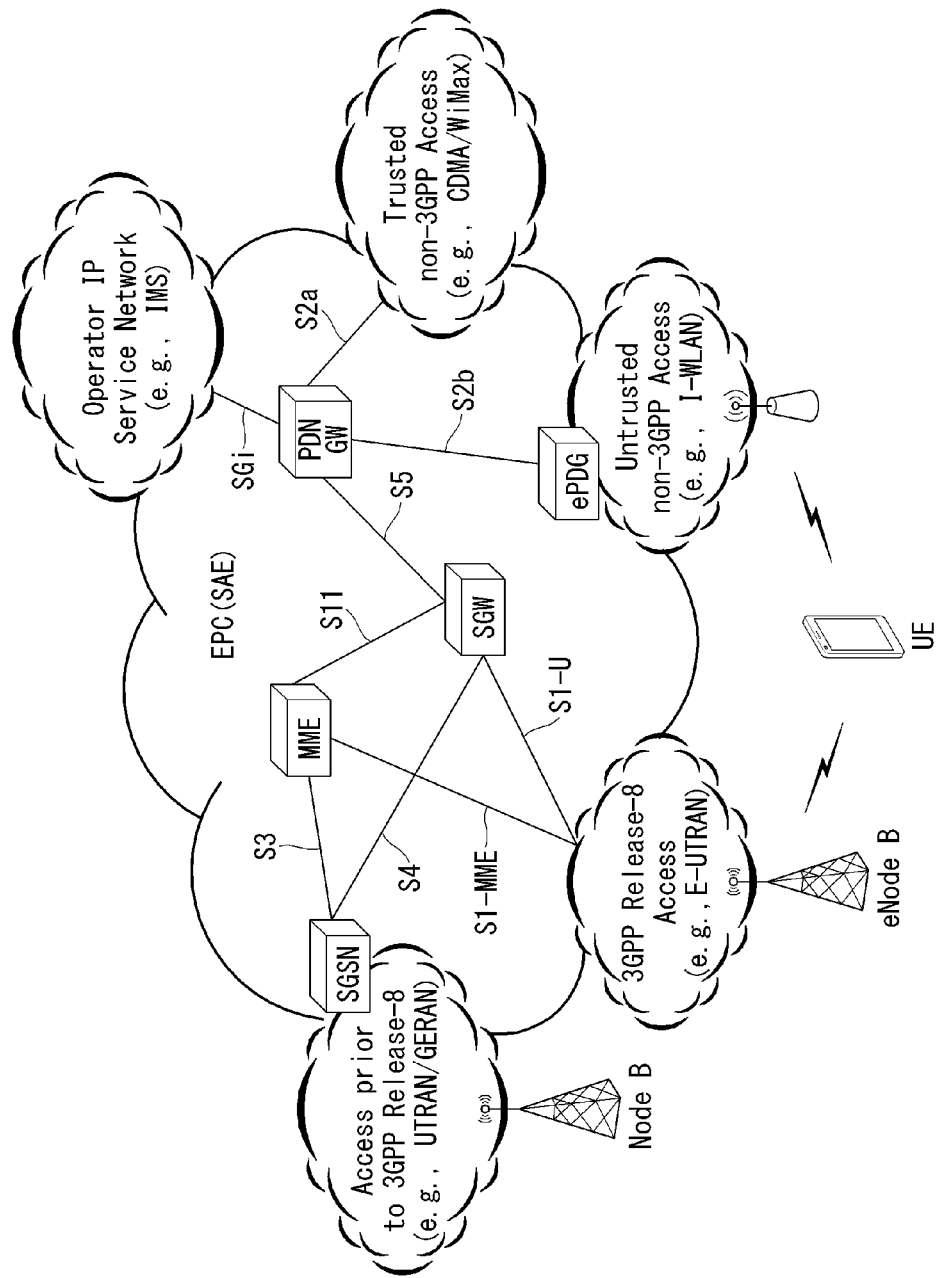
[FIG. 4]

[FIG. 5]
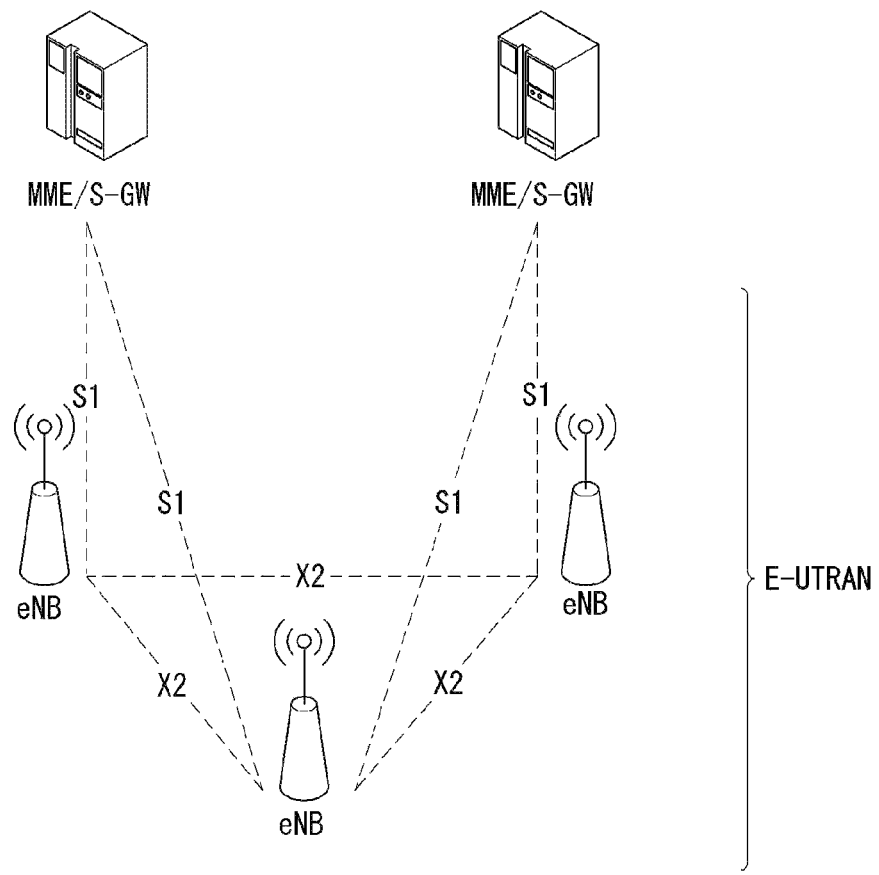

[FIG. 6]
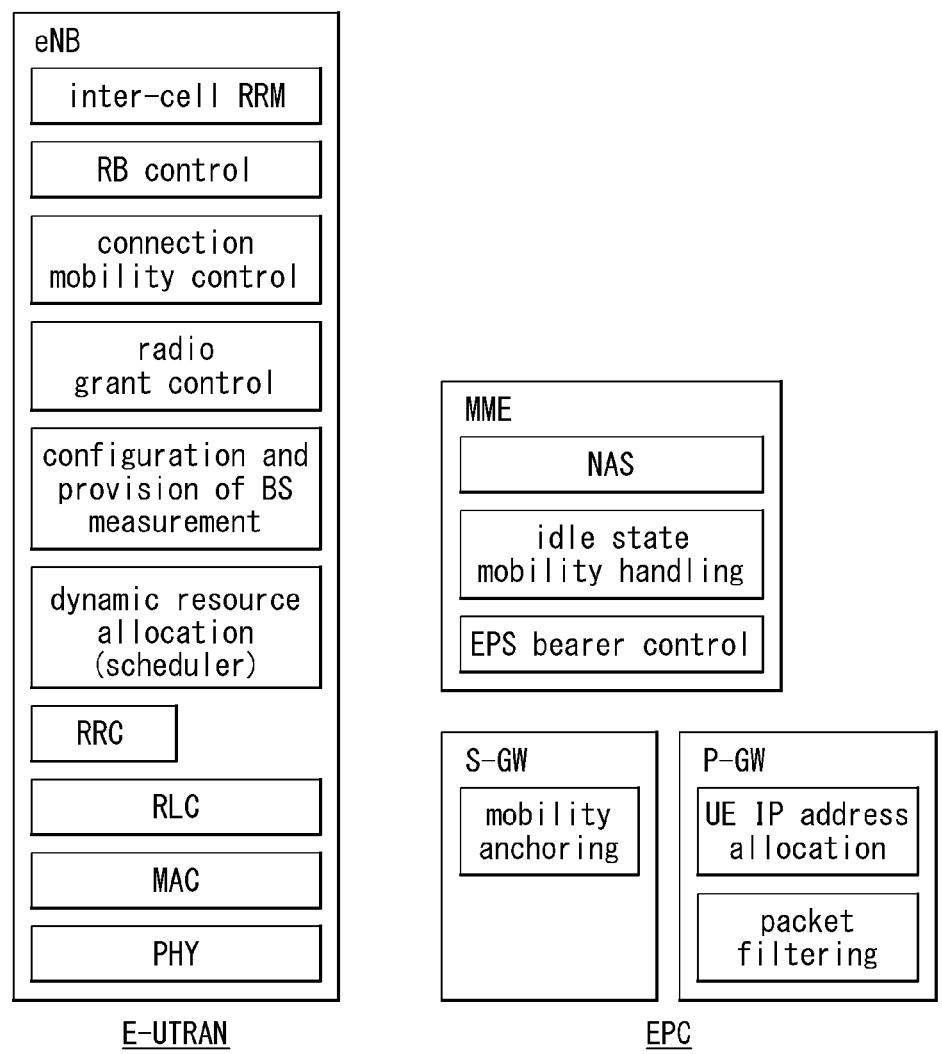

[FIG. 7]
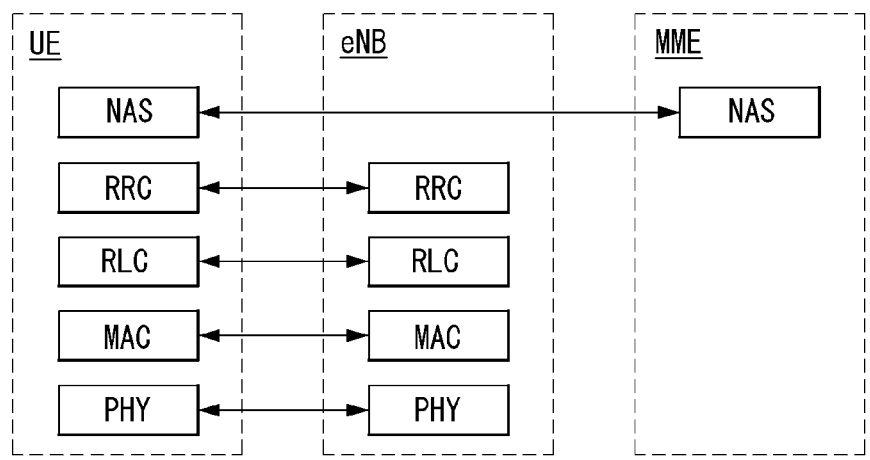
[FIG. 8]
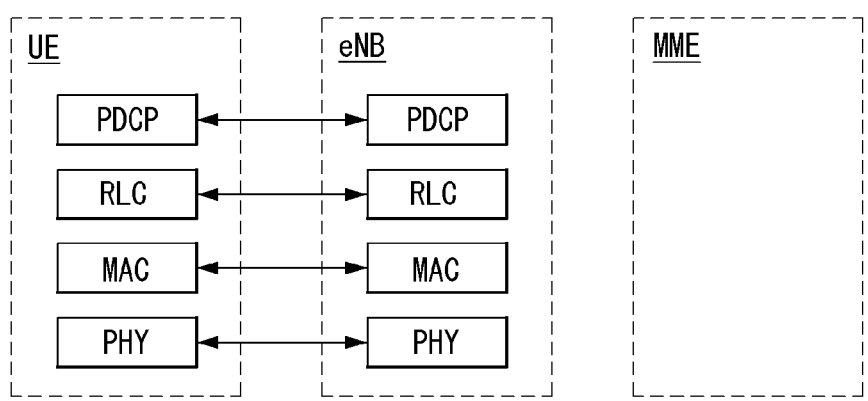

[FIG. 9]
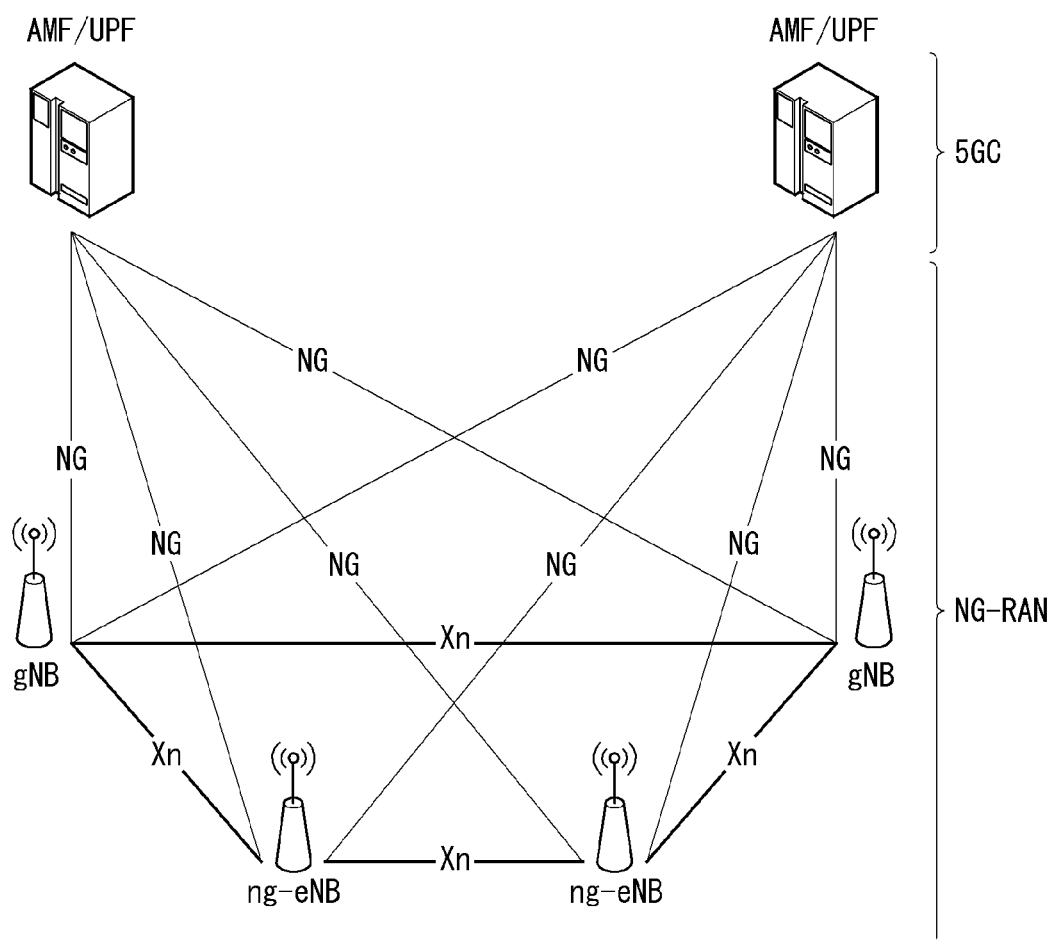

[FIG. 10]
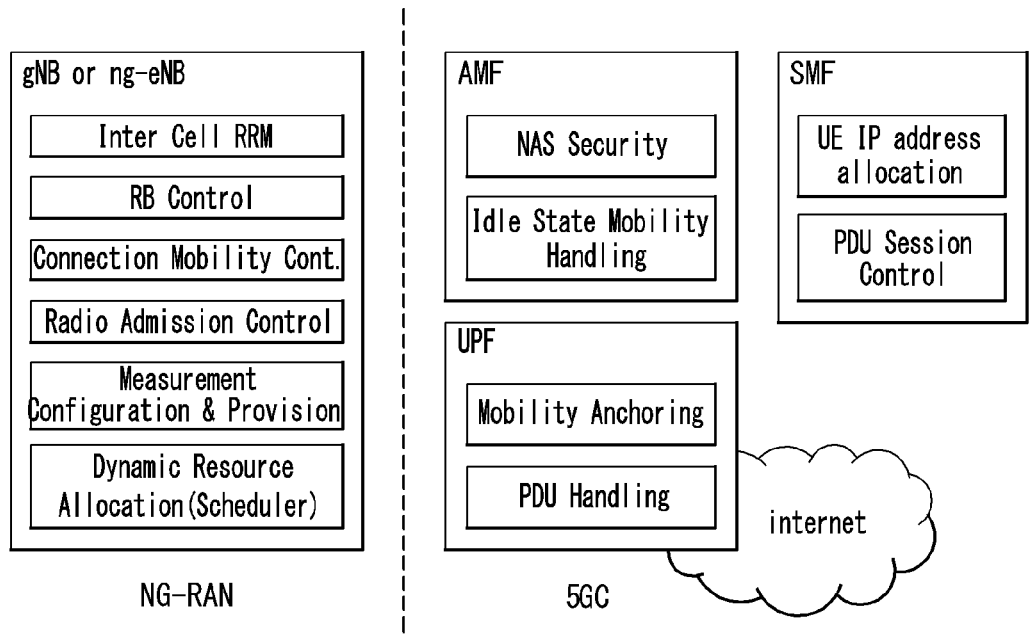
[FIG. 11]
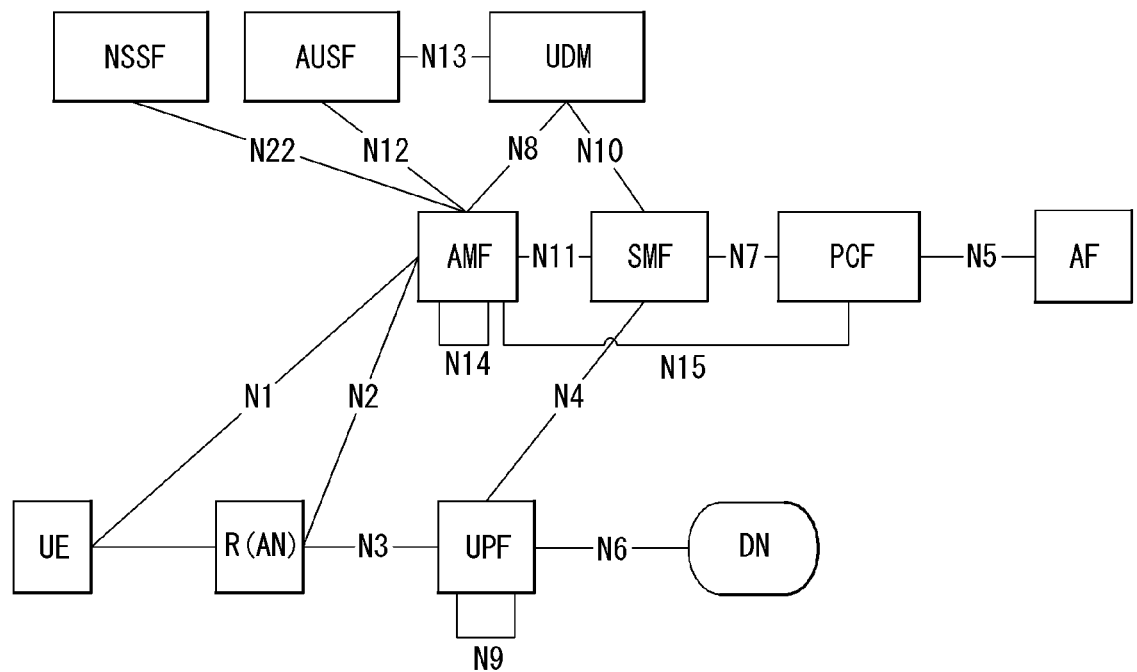

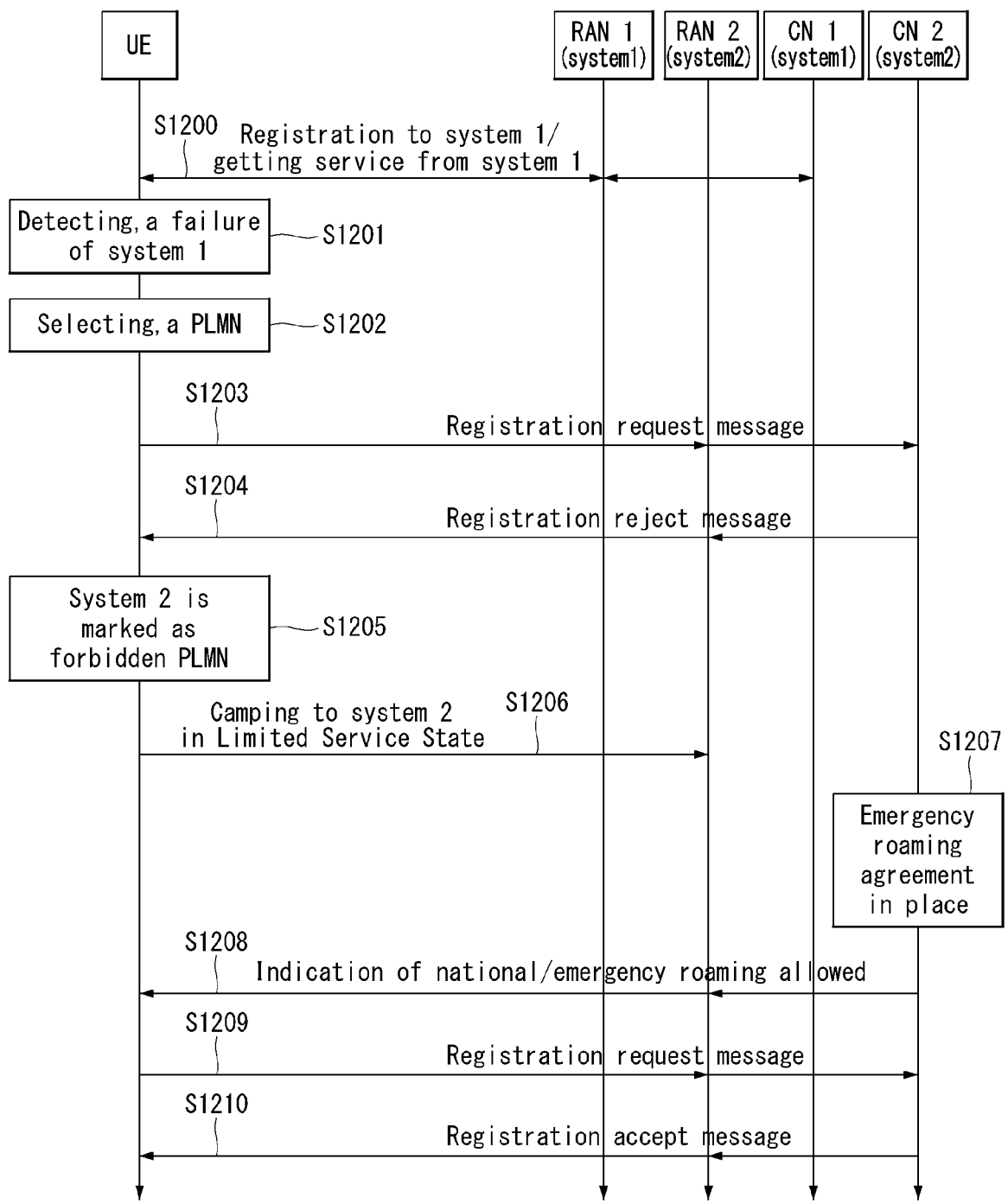
[FIG. 12]

[FIG. 13]
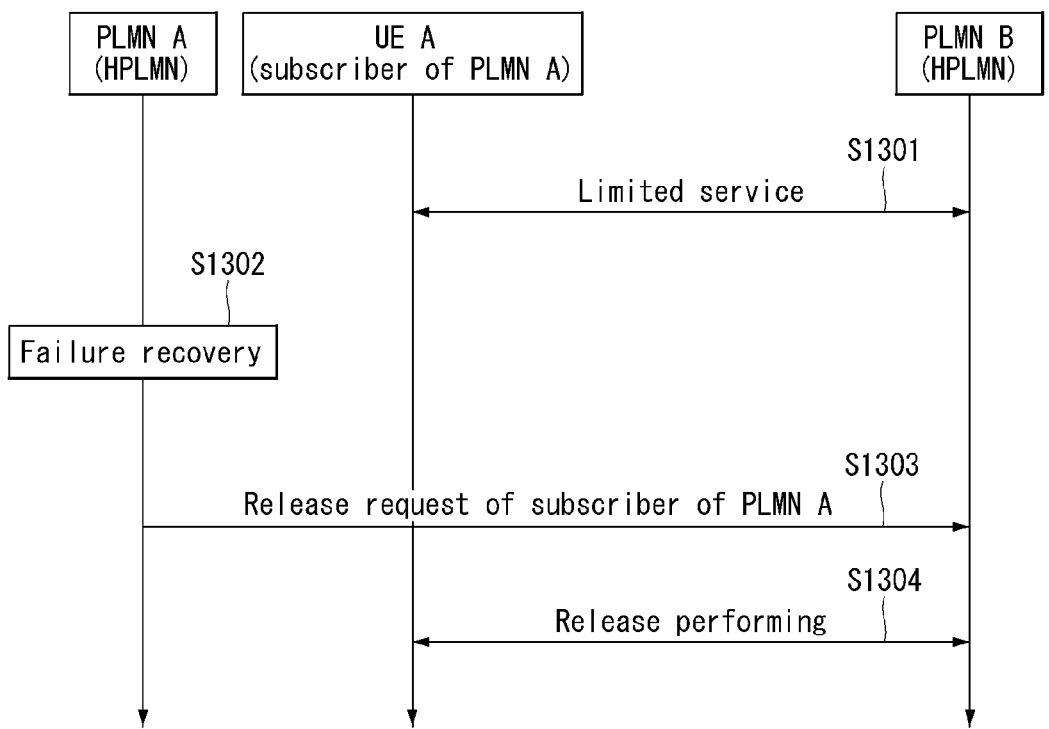
[FIG. 14]
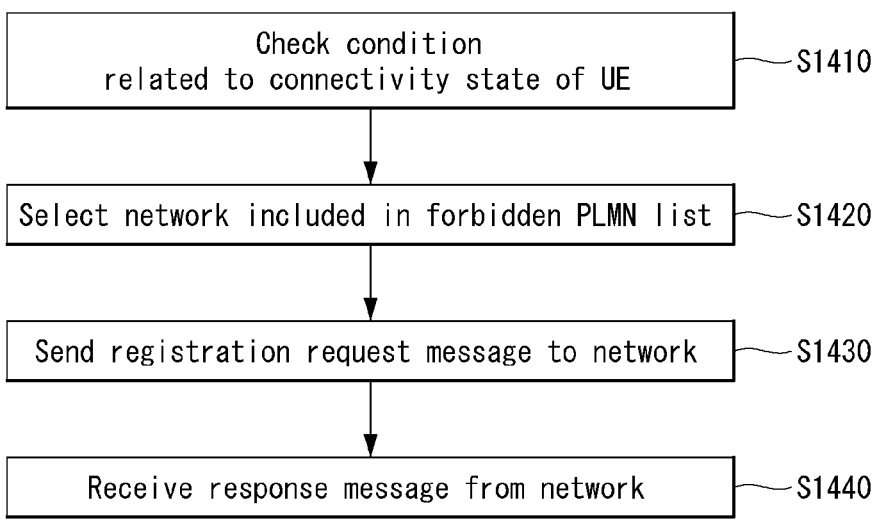

[FIG. 15]
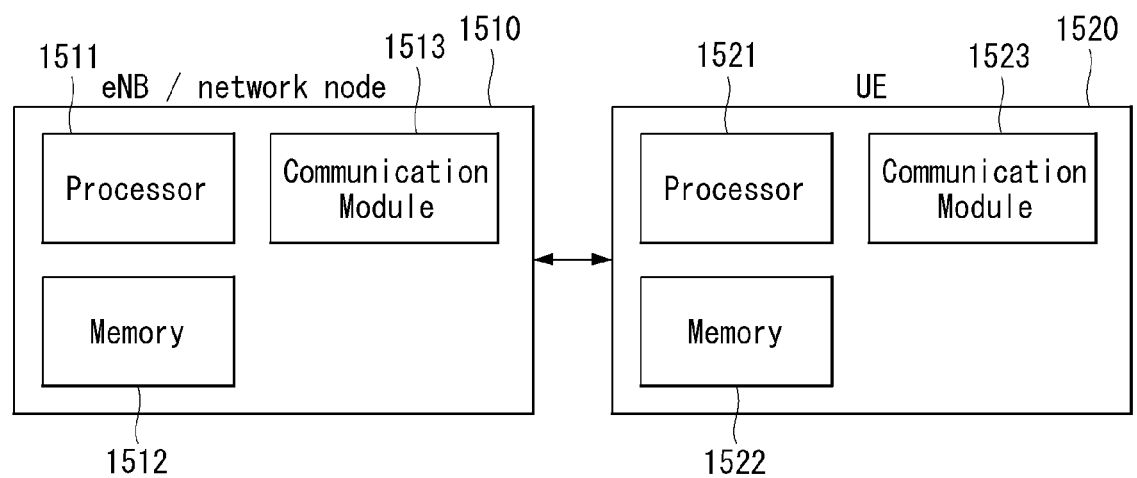

[FIG. 16]
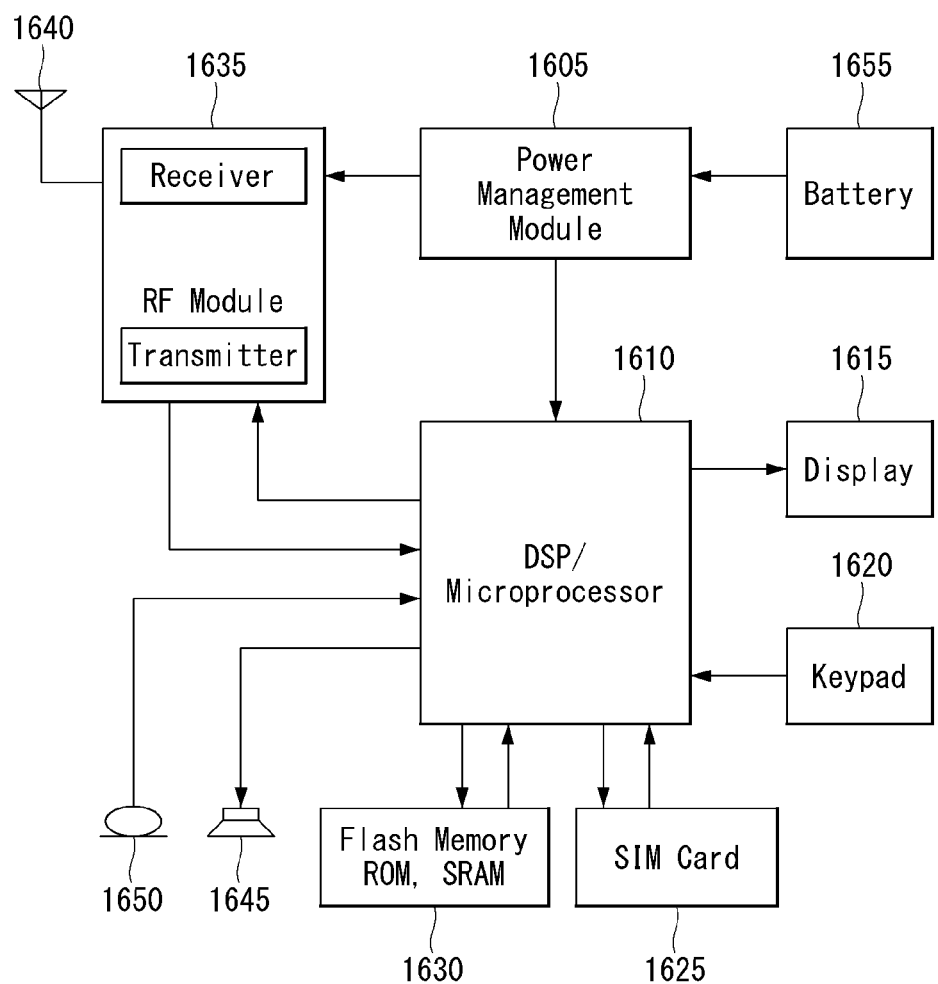

[FIG. 17]
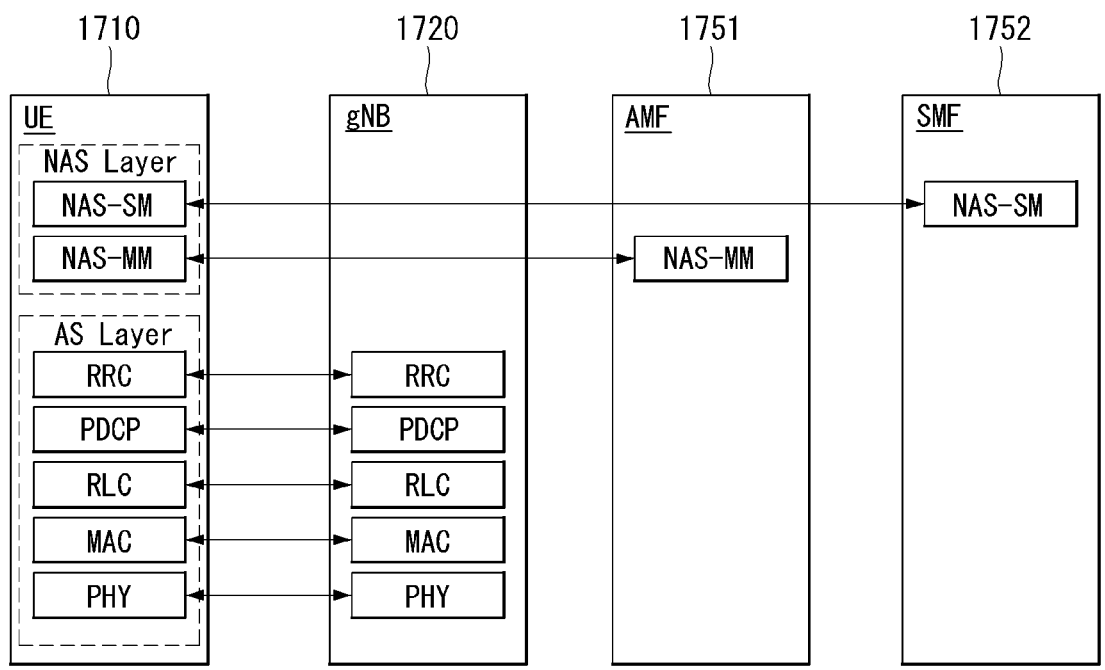

METHOD FOR SELECTING NETWORK IN WIRELESS COMMUNICATION SYSTEM

CROSS-REFERENCE TO RELATED APPLICATIONS

This application is the National Stage filing under 35 U.S.C. 371 of International Application No. PCT/KR2020/000172, filed on Jan. 6, 2020, which claims the benefit of Korean Patent Application Nos. 10-2019-0001415, filed on Jan. 4, 2019, and 10-2019-0049056, filed on Apr. 26, 2019, the contents of which are all hereby incorporated by reference herein in their entirety.

TECHNICAL FIELD

The present disclosure relates to a method for performing roaming to a network of other available surrounding service provider and receiving services, when a UE is located in a service provision area of a service provider to which the UE subscribes, but the service provider cannot temporarily provide services. In particular, the present disclosure relates to a communication system and method for minimizing a reduction in a user service experience of a UE by minimizing time for which services from a network of other service provider are not provided to the UE after the UE receives a registration reject from the network of other service provider.

BACKGROUND ART

In a wireless communication system, mobile communication systems have been developed to provide a voice service while ensuring the activity of a user. However, the area of the mobile communication systems has extended to a data service in addition to a voice. Due to the current explosive increase in traffic, there is a shortage of resources, and thus users demand a higher speed service. Accordingly, there is a need for a more advanced mobile communication system.

Requirements for next-generation mobile communication systems need to able to support the accommodation of explosive data traffic, a dramatic increase in data rate per user terminal, the accommodation of a significant increase in the number of connected devices, very low end-to-end latency, and high-energy efficiency. To this end, studies have been conducted on various technologies such as dual connectivity, massive multiple input multiple output (MIMO), in-band full duplex, non-orthogonal multiple access (NOMA), super wideband support, and device networking.

DISCLOSURE

Technical Problem

An object of the present disclosure is to provide a method for preventing interruption of wireless communication services.

Another object of the present disclosure is to provide a method for a UE to use roaming service when there is interruption of wireless communication services.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect, there is provided a method of selecting, by a user equipment (UE), a network for performing a registration in a wireless communication system, the method comprising checking a condition related to a connectivity state of the UE; selecting a first network included in a forbidden public land mobile network (PLMN) list based on the condition related to the connectivity state of the UE; transmitting, to the first network, a registration request message; and receiving, from the first network, a response message as a response to the registration request message.

The forbidden PLMN list may include a list of networks that are not selected by the UE.

The method may further comprise receiving, from the first network, the condition related to the connectivity state of the UE.

The method may further comprise receiving, from the first network, information representing whether the first network is applicable to the condition related to the connectivity state of the UE.

The first network may be selected based on the condition related to the connectivity state of the UE when there is no selectable network that is not included in the forbidden PLMN list.

The condition related to the connectivity state of the UE may be related to an interruption or a failure of a service provided to the UE via a second network.

The method may further comprise receiving, from the second network, the condition related to the connectivity state of the UE.

The interruption or the failure of the service may be generated due to the second network or an disaster of an area in which the UE is located.

The second network may be a PLMN to which the UE subscribes, and the area in which the UE is located may be included in a country in which the UE is subscribed.

In another aspect, there is provided a method for a first network to be selected by a user equipment (UE) in a wireless communication system, the method comprising transmitting, to the UE, information representing whether the first network is applicable to a condition related to a connectivity state of the UE; receiving, from the UE, a registration request message; and transmitting, to the UE, a response message as a response to the registration request message, wherein the first network is included in a forbidden public land mobile network (PLMN) list of the UE.

The forbidden PLMN list may include a list of networks that are not selected by the UE.

The condition related to the connectivity state of the UE is related to an interruption or a failure of a service provided to the UE via a second network.

The interruption or the failure of the service may be generated due to the second network or an disaster of an area in which the UE is located.

The second network may be a PLMN to which the UE subscribes, and the area in which the UE is located may be included in a country in which the UE is subscribed.

The method may further comprise making a roaming agreement with the second network based on the condition related to the connectivity state of the UE.

In another aspect, there is provided a user equipment (UE) selecting a network for performing a registration in a wireless communication system, the UE comprising a transceiver; a memory; and a processor configured to control the transceiver and the memory, wherein the processor is configured to check a condition related to a connectivity state of the UE; select a first network included in a forbidden public land mobile network (PLMN) list based on the condition related to the connectivity state of the UE; transmit, to the first network, a registration request message via the transceiver; and receive, from the first network, a response message as a response to the registration request message.

Advantageous Effects

The present disclosure can prevent interruption of wireless communication services.

The present disclosure can allow a UE to use roaming service when there is interruption of wireless communication services.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates various reference points.

FIG. 5 illustrates an example of a network structure of an evolved universal terrestrial radio access network (E-UTRAN) to which the present disclosure is applicable.

FIG. 6 illustrates an example of a general architecture of E-UTRAN and EPC.

FIG. 7 illustrates an example of a structure of a radio interface protocol in a control plane between a UE and eNB.

FIG. 8 illustrates an example of a structure of a radio interface protocol in a user plane between a UE and eNB.

FIG. 9 illustrates a general architecture of NR-RAN.

FIG. 10 illustrates an example of general functional split between NG-RAN and 5GC.

FIG. 11 illustrates an example of a general architecture of 5G.

FIG. 12 illustrates an embodiment to which the present disclosure is applicable.

FIG. 13 illustrates an embodiment to which the present disclosure is applicable.

FIG. 14 illustrates an embodiment of a UE to which the present disclosure is applicable.

FIG. 15 illustrates a block diagram of configuration of a communication device according to an embodiment of the present disclosure.

FIG. 16 illustrates a block diagram of configuration of a communication device according to an embodiment of the present disclosure.

FIG. 17 illustrates an example of a structure of a radio interface protocol in a control plane between a UE and eNodeB.

MODE FOR INVENTION

Reference will now be made in detail to embodiments of the disclosure, examples of which are illustrated in the accompanying drawings. A detailed description to be disclosed below together with the accompanying drawing is to describe exemplary implementations of the present disclosure and not to describe a unique implementation for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Description of Terms in the Present Disclosure

In the present disclosure, a base station (BS) refers to a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced by terms such as a fixed station, Node B, evolved-NodeB (eNB), a base transceiver system (BTS), an access point (AP), and gNB (general NB). Further, a 'terminal' may be fixed or movable and may be replaced by terms such as user equipment (UE), a mobile station (MS), a user terminal (UT), a mobile subscriber station (MSS), a subscriber station (SS), an advanced mobile station (AMS), a wireless terminal (WT), a machine type communication (MTC) device, a machine-to-machine (M2M) device, and a device-to-device (D2D) device.

In the present disclosure, downlink (DL) refers to communication from the base station to the terminal, and uplink (UL) refers to communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and non-orthogonal multiple access (NOMA). The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, and E-UTRA (evolved UTRA). The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in downlink and adopts the SC-FDMA in uplink. LTE-advanced (A) is an evolution of the 3GPP LTE.

Embodiments of the present disclosure can be supported by standard documents disclosed in at least one of the IEEE 802, 3GPP, and 3GPP2 specifications regarding wireless access systems. In other words, in embodiments of the present disclosure, those steps or parts omitted for the purpose of clearly describing technical principles of the present disclosure can be supported by the standard documents. All the terms disclosed in the present disclosure can also be explained by the standard documents.

3GPP LTE/LTE-A is primarily described for clear description, but technical features of the present disclosure are not limited thereto.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an internet protocol (IP) based packet switched core network, and an access network such as LTE and UTRAN. The EPS is a network of an evolved version of UMTS.

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE may refer to terms such as a terminal, a mobile equipment (ME), and a mobile station (MS). The UE can be a portable device such as a notebook computer, a cellular phone, a personal digital assistant (PDA), a smart phone, and a multimedia device, or a non-portable device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MTC apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) and eNodeB controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): a network node in the EPS network which performs mobility management and session management functions.

Packet Data Network Gateway (PDN-GW): a network node in the EPS network which performs UE IP address allocation, packet screening and filtering, and charging data collection functions.

Serving GW (Serving Gateway): a network node in the EPS network which performs functions such as mobility anchor, packet routing, idle mode packet buffering, and triggering of paging for the UE of MME.

Policy and Charging Rule Function (PCRF): a node in the EPS network which performs policy decision to dynamically apply differentiated QoS and billing policies per each service flow.

Open Mobile Alliance Device Management (OMA DM): A protocol designed to manage mobile devices, such as mobile phones, PDAs, and portable computers, which performs functions such as device configuration, firmware upgrade, and error report Operation Administration and Maintenance (OAM): A network management function group which provides network fault indication, performance information, and data and diagnostic functions.

Packet Data Network (PDN): a network in which a server (e.g., MMS server, WAP server, etc.) supporting a specific service is located.

PDN connection: a connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and S1 signaling connection between the eNB and the MME. When the ECM connection is established/terminated, the RRC and S1 signaling connections are established/ terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a S1 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPv6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network.

Cell as a radio resource: the 3GPP LTE/LTE-A system has used a concept of a cell to manage radio resources, and a cell related to the radio resource is distinguished from a cell of a geographic area. The "cell" related to the radio resource is defined as a combination of downlink (DL) resources and uplink (UL) resources, i.e., a combination of DL carriers and UL carriers. The cell may be configured with DL resource only or a combination of DL resources and UL resources. If carrier aggregation is supported, a linkage between a carrier frequency of the DL resource and a carrier frequency of the UL resource may be indicated by system information.

Here, the carrier frequency refers to a center frequency of each cell or carrier. In particular, a cell operating on a primary frequency is called a primary cell or Pcell, and a cell operating on a secondary frequency is called a secondary cell or Scell. The Scell refers to a cell that can be configured after radio resource control (RRC) connection establishment is achieved and can be used for providing additional radio resources. Depending on capabilities of the UE, the Scell together with the Pcell can form a set of serving cells for the UE. For the UE that is in a RRC_CONNECTED state but is not configured with carrier aggregation, or does not support carrier aggregation, there is only one serving cell configured with only the Pcell. The "cell" of the geographic area can be understood as a coverage in which a node can provide services using a carrier, and the "cell" of the radio resource is related to a bandwidth (BW) that is a frequency range configured by the carrier. Since a downlink coverage that is a range within which the node can transmit a valid signal and an uplink coverage that is a range within which the node can receive the valid signal from the UE depend on the carrier carrying the corresponding signal, the coverage of the node is associated with the coverage of the "cell" of the radio resource the node uses. Thus, the term "cell" may be used to sometimes denote the coverage of the service by the node, sometimes denote the radio resource, and sometimes denote a range that a signal using the radio resources can reach with a valid strength.

The EPC is a key element of system architecture evolution (SAE) to improve the performance of 3GPP technologies. The SAE corresponds to a research project to determine a network structure supporting mobility between various kinds of networks. The SAE aims to provide an optimized packet-based system, for example, supporting various radio access technologies on an IP basis and providing more improved data transfer capability.

More specifically, the EPC is a core network of an IP mobile communication system for the 3GPP LTE system and can support packet-based real-time and non-real time services. In the existing mobile communication system (i.e., in the 2nd or 3rd mobile communication system), functions of the core network have been implemented through two separate sub-domains including a circuit-switched (CS) sub-domain for voice and a packet-switched (PS) sub-domain for data. However, in the 3GPP LTE system that is an evolution of the 3rd mobile communication system, the CS and PS sub-domains have been unified into a single IP domain. That is, in the 3GPP LTE system, a connection between UEs having IP capabilities can be configured via an IP-based base station (e.g., evolved Node B (eNodeB)), an EPC, and an application domain (e.g., IP multimedia subsystem (IMS)). In other words, the EPC is an essential architecture to implement end-to-end IP services.

The EPC may include various components, and FIG. 1 illustrates some of the EPC components, including a serving gateway (SGW), a packet data network gateway (PDN GW), a mobility management entity (MME), a SGSN (serving GPRS (general packet radio service) supporting node), and an enhanced packet data gateway (ePDG).

The SGW (or S-GW) operates as a boundary point between a radio access network (RAN) and a core network, and is an element that functions to maintain a data path between the eNB and the PDN GW. Further, if the UE moves across areas served by the eNB, the SGW serves as a local mobility anchor point. That is, packets can be routed through the SGW for mobility within the E-UTRAN (evolved-universal mobile telecommunications system (UMTS) terrestrial radio access network defined in 3GPP Release-8 or later). The SGW may also serve as an anchor point for mobility with other 3GPP networks (RAN defined before 3GPP Release-8, for example, UTRAN or GERAN (global system for mobile communication (GSM)/enhanced data rates for global evolution (EDGE) radio access network).

The PDN GW (or P-GW) corresponds to a termination point of a data interface to a packet data network. The PDN GW can support policy enforcement features, packet filtering, charging support, and the like. In addition, the PDN GW can serve as an anchor point for mobility management between the 3GPP network and a non-3GPP network (e.g., untrusted networks such as an interworking wireless local area network (I-WLAN) or trusted networks such as a code division multiple access (CDMA) network and Wimax).

Hereinafter, the present disclosure is described based on the terms defined as above.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The present disclosure described below can be implemented by combining or modifying respective embodiments to meet the above-described requirements of 5G.

The following describes in detail technical fields to which the present disclosure described below is applicable.
Artificial Intelligence (AI)

Artificial intelligence means the field in which artificial intelligence or methodology capable of making the artificial intelligence is researched. Machine learning means the field in which various problems handled in the artificial intelligence field are defined and methodology for solving the problems is researched. Machine learning is also defined as an algorithm for improving performance of a task through continuous experiences for the task.

An artificial neural network (ANN) is a model used in machine learning, and may refer to the entire model with a problem-solving ability which consists of artificial neurons (nodes) forming a network through a combination of synapses. The artificial neural network may be defined by a connection pattern between neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weights, and bias that are input through a synapse.

A model parameter means a parameter determined through learning, and includes the weight of a synapse connection and the bias of a neuron. Furthermore, a hyper parameter refers to a parameter that shall be configured before learning in a machine learning algorithm, and includes a learning rate, the number of times of repetitions, a mini-deployment size, and an initialization function.

The purpose of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. The deep learning is part of the machine learning. Hereinafter, the machine learning is used as a meaning including the deep learning.
Robot A robot may mean a machine that automatically processes a given task or operates based on an autonomously owned ability. Particularly, a robot having a function for recognizing and autonomously determining an environment and performing an operation may be called an intelligent robot.

The robot may be classified for industry, medical treatment, home, and military based on its use purpose or field.

The robot includes a driver including an actuator or motor, and can perform various physical operations, such as moving a robot joint. Furthermore, a movable robot includes a wheel, a brake, a propeller, etc. in the driver, and may run on the ground or fly in the air through the driver.
Self-Driving (Autonomous-Driving)

Self-driving means a technology for autonomous driving. A self-driving vehicle means a vehicle that runs without user manipulation or by user's minimum manipulation.

For example, self-driving may include all of a technology for maintaining a driving lane, a technology for automatically controlling speed such as adaptive cruise control, a technology for automatically driving along a fixed path, a technology for automatically setting and driving a path when a destination is set, and the like.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this instance, the self-driving vehicle may be considered as a robot having a self-driving function.
Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object together.

However, there is a difference in that a virtual object is used to supplement a real object in the AR technology, and on the other hand, a virtual object and a real object are used as the same character in the MR technology.

The XR technology can be applied to a head-mount display (HMD), a head-up display (HUD), a mobile phone, a tablet PC, a laptop, a desktop, TV, a digital signage, and the like. A device to which the XR technology is applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from the external devices.

Examples of communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

The input unit 120 may include a camera for an image signal input, a microphone for receiving an audio signal, a user input unit for receiving information from a user, etc. Herein, the camera or the microphone is treated as a sensor, and thus a signal obtained from the camera or the microphone may be referred to as sensing data or sensor information.

The input unit 120 can obtain learning data for model learning and input data to be used when an output is obtained using a learning model. The input unit 120 can obtain not-processed input data. In this case, the processor 180 or the learning processor 130 can extract an input feature by performing pre-processing on the input data.

The learning processor 130 may be trained by a model constructed by an artificial neural network using learning data. In this case, the trained artificial neural network may be called a learning model. The learning model may be used to deduce a result value of new input data not learning data, and the deduced value may be used as a base for performing a given operation.

The learning processor 130 can perform AI processing along with a learning processor 240 of the AI server 200.

The learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 can obtain at least one of internal information of the AI device 100, surrounding environment information of the AI device 100, or user information using various sensors.

Examples of sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 can generate an output related to a visual sense, an auditory sense or a tactile sense.

The output unit 150 may include a display for outputting visual information, a speaker for outputting auditory information, and a haptic module for outputting tactile information.

The memory 170 can store data supporting various functions of the AI device 100. For example, the memory 170 can store input data obtained by the input unit 120, learning data, a learning model, a learning history, etc.

The processor 180 can determine at least one executable operation of the AI device 100 based on information that is determined or generated using a data analysis algorithm or a machine learning algorithm. Furthermore, the processor 180 can perform operation determined by controlling the components of the AI device 100.

To this end, the processor 180 can request, search, receive, or utilize data of the learning processor 130 or the memory 170, and can control the components of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 can obtain intention information for a user input and transmit user requirements based on the obtained intention information.

The processor 180 can obtain the intention information corresponding to the user input using at least one of a speech to text (STT) engine for converting a voice input into a text string or a natural language processing (NLP) engine for obtaining intention information of a natural language.

In this case, at least one of the STT engine or the NLP engine may be constructed by an artificial neural network of which at least a portion is trained according to a machine learning algorithm. Furthermore, at least one of the STT engine or the NLP engine may have been trained by the learning processor 130, may have been trained by the learning processor 240 of the AI server 200, or may have been trained by distributed processing thereof.

The processor 180 may collect history information including the feedback, etc. of the user for the operation contents or an operation of the AI device 100, and may store the history information in the memory 170 or the learning processor 130 or may transmit the history information to an external device such as the AI server 200. The collected history information may be used to update a learning model.

The processor 180 may control at least some of the components of the AI device 100 in order to run an application program stored in the memory 170. Moreover, the processor 180 may combine and operate two or more of the components included in the AI device 100 in order to run the application program.

FIG. 2 illustrates an AI server 200 according to an embodiment of the present disclosure.

Referring to FIG. 2, the AI server 200 may refer to a device which is trained by an artificial neural network using a machine learning algorithm or which uses a trained artificial neural network. Herein, the AI server 200 consists of a plurality of servers and may perform distributed processing and may be defined as a 5G network. Further, the AI server 200 may be included as a partial configuration of the AI device 100 and may perform at least a part of AI processing.

The AI server 200 may include a communication unit 210, a memory 230, a learning processor 240, and a processor 260.

The communication unit 210 may transmit and receive data to and from an external device such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network, or may be mounted on an external device such as the AI device 100 and used.

The learning model may be implemented as hardware, software or a combination of hardware and software. If a part or all of the learning model is implemented as software, one or more instructions constructing the learning model may be stored in the memory 230.

The processor 260 may deduce a result value of new input data using the learning model and generate a response or a control command based on the deduced result value.

FIG. 3 illustrates an AI system 1 according to an embodiment of the present disclosure.

Referring to FIG. 3, in the AI system 1, at least one of the AI server 200, a robot 100a, a self-driving vehicle 100b, an XR device 100c, a smartphone 100d, or home appliances 100e is connected to a cloud network 10. The robot 100a, the self-driving vehicle 100b, the XR device 100c, the smartphone 100d or the home appliances 100e to which the AI technology is applied may be called AI devices 100a to 100e.

The cloud network 10 may constitute part of cloud computing infra or may mean a network present within cloud computing infra. The cloud network 10 may be configured using the 3G network, the 4G or long term evolution (LTE) network, or the 5G network.

That is, the devices 100a to 100e and 200 constituting the AI system 1 may be interconnected over the cloud network 10. In particular, the devices 100a to 100e and 200 may communicate with each other through a base station, or may directly communicate with each other without the intervention of the base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that are AI devices constituting the AI system 1, over the cloud network 10, and may help at least part of the AI processing of the connected AI devices 100a to 100e.

The AI server 200 can train an artificial neural network based on a machine learning algorithm in place of the AI devices 100a to 100e, and can directly store a learning model or transmit the learning model to the AI devices 100a to 100e.

The AI server 200 can receive input data from the AI devices 100a to 100e, deduce a result value of the received input data using the learning model, generate a response or control command based on the deduced result value, and transmit the response or control command to the AI devices 100a to 100e.

Alternatively, the AI devices 100a to 100e can directly deduce a result value of input data using a learning model, and can generate a response or a control command based on the deduced result value.

Various implementations of the AI devices 100a to 100e to which the above-described technologies are applied are described below. Herein, the AI devices 100a to 100e illustrated in FIG. 3 may be considered as detailed implementations of the AI device 100 illustrated in FIG. 1.

AI and Robot to which the Present Disclosure is Applicable

The AI technology is applied to the robot 100a, and the robot 100a may be implemented as a guidance robot, a transport robot, a cleaning robot, a wearable robot, an entertainment robot, a pet robot, an unmanned aerial robot, etc.

The robot 100a may include a robot control module for controlling an operation. The robot control module may mean a software module or a chip in which a software module is implemented using hardware.

The robot 100a may obtain status information of the robot 100a, detect (recognize) a surrounding environment and an object, generate map data, determine a moving path and a running plan, determine a response to a user interaction, or determine an operation, using sensor information obtained from various types of sensors.

The robot 100a may use sensor information obtained by at least one sensor of LIDAR, a radar, and a camera in order to determine the moving path and the running plan.

The robot 100a may perform the above operations using a learning model consisting of at least one artificial neural network. For example, the robot 100a may recognize a surrounding environment and an object using the learning model, and determine an operation using the recognized surrounding environment information or object information. Herein, the learning model may have been directly trained in the robot 100a or may have been trained in an external device such as the AI server 200.

The robot 100a may directly generate results using the learning model and perform an operation, but may perform an operation by transmitting sensor information to an external device such as the AI server 200 and receiving results generated in response to this.

The robot 100a may determine the moving path and the running plan using at least one of map data, object information detected from sensor information, or object information obtained from the external device. The robot 100a may run along the determined moving path and running plan by controlling the driver.

The map data may include object identification information for various objects disposed in the space in which the robot 100a moves. For example, the map data may include object identification information for fixed objects, such as a wall and a door, and movable objects, such as a flowerport and a desk. Furthermore, the object identification information may include a name, a type, a distance, a location, etc.

Furthermore, the robot 100a may perform an operation or run by controlling the driver based on a user's control/interaction. In this case, the robot 100a may obtain intention information of interaction according to a user's behavior or voice utterance, may determine a response based on the obtained intention information, and may perform an operation.

AI and Self-Driving to which the Present Disclosure is Applicable

The AI technology is applied to the self-driving vehicle 100b, and the self-driving vehicle 100b may be implemented as a mobile robot, a vehicle, an unmanned aerial vehicle, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as the component of the self-driving vehicle 100b, but may be configured as separate hardware outside the self-driving vehicle 100b and connected to the self-driving vehicle 100b.

The self-driving vehicle 100b may obtain status information of the self-driving vehicle 100b, detect (recognize) a surrounding environment and object, generate map data, determine a moving path and a running plan, or determine an operation, using sensor information obtained from various types of sensors.

In order to determine the moving path and the running plan, the self-driving vehicle 100b may use sensor information obtained from at least one sensor among LIDAR, a radar and a camera, in the same manner as the robot 100a.

Particularly, the self-driving vehicle 100b may recognize an environment or an object in an area in which a sight is blocked or an area of a predetermined distance or more by receiving sensor information from external devices, or may receive information that is directly recognized from the external devices.

The self-driving vehicle 100b may perform the above operations using a learning model consisting of at least one artificial neural network. For example, the self-driving vehicle 100b may recognize a surrounding environment and object using a learning model and determine a running path using the recognized surrounding environment information or object information. Herein, the learning model may have been directly trained in the self-driving vehicle 100b or may have been trained in an external device such as the AI server 200.

In this instance, the self-driving vehicle 100b may directly generate results using the learning model to perform an operation, but may perform an operation by transmitting sensor information to an external device such as the AI server 200 and receiving results generated in response to this.

The self-driving vehicle 100b may determine a moving path and a running plan using at least one of map data, object information detected from sensor information, or object information obtained from an external device. The self-driving vehicle 100b may run based on the determined moving path and running plan by controlling the driver.

The map data may include object identification information for various objects disposed in the space (e.g., road) on which the self-driving vehicle 100b runs. For example, the map data may include object identification information for fixed objects, such as a streetlight, a rock, and a building, etc., and mobile objects, such as a vehicle and a pedestrian. Furthermore, the object identification information may include a name, a type, a distance, a location, etc.

Furthermore, the self-driving vehicle 100b may perform an operation or run by controlling the driver based on a user's control/interaction. In this case, the self-driving vehicle 100b may obtain intention information of an interaction according to a user' behavior or voice speaking, may determine a response based on the obtained intention information, and may perform an operation.

AI and XR to which the Present Disclosure is Applicable

The AI technology is applied to the XR device 100c, and the XR device 100c may be implemented as a head-mount display (HMD), a head-up display (HUD) provided in a vehicle, television, a mobile phone, a smartphone, a computer, a wearable device, home appliances, a digital signage, a vehicle, a fixed robot or a mobile robot.

The XR device 100c may generate location data and attributes data for three-dimensional (3D) points by analyzing 3D point cloud data or image data obtained through various sensors or from an external device, may obtain information on a surrounding space or real object based on the generated location data and attributes data, and may output an XR object by rendering the XR object. For example, the XR device 100c may output an XR object including additional information for a recognized object by making the XR object correspond to the corresponding recognized object.

The XR device 100c may perform the above operations using a learning model consisting of at least one artificial neural network. For example, the XR device 100c may recognize a real object in 3D point cloud data or image data using a learning model, and may provide information corresponding to the recognized real object. In this case, the learning model may have been directly trained in the XR device 100c or may have been trained in an external device such as the AI server 200.

In this instance, the XR device 100c may directly generate results using a learning model and perform an operation, but may perform an operation by transmitting sensor information to an external device such as the AI server 200 and receiving results generated in response to this.

AI, Robot and Self-Driving to which the Present Disclosure is Applicable

The AI technology and the self-driving technology are applied to the robot 100a, and the robot 100a may be implemented as a guidance robot, a transport robot, a cleaning robot, a wearable robot, an entertainment robot, a pet robot, an unmanned aerial robot, etc.

The robot 100a to which the AI technology and the self-driving technology are applied may mean a robot itself having a self-driving function, or may mean the robot 100a interacting with the self-driving vehicle 100b.

The robot 100a with the self-driving function may collectively refer to devices that move by itself along a given path without control of a user or determine by itself a moving path and move.

The robot 100a with the self-driving function and the self-driving vehicle 100b may use a common sensing method to determine one or more of a moving path or a running plan. For example, the robot 100a with the self-driving function and the self-driving vehicle 100b may determine one or more of a moving path or a running plan using information sensed through LIDAR, radar, a camera, etc.

The robot 100a interacting with the self-driving vehicle 100b is present separately from the self-driving vehicle 100b, and may perform an operation associated with a self-driving function inside or outside the self-driving vehicle 100b or an operation associated with a user got in the self-driving vehicle 100b.

In this case, the robot 100a interacting with the self-driving vehicle 100b may control or assist the self-driving function of the self-driving vehicle 100*b* by obtaining sensor information in place of the self-driving vehicle 100*b* and providing the sensor information to the self-driving vehicle 100*b*, or by obtaining sensor information, generating surrounding environment information or object information, and providing the surrounding environment information or object information to the self-driving vehicle 100*b*.

Alternatively, the robot 100*a* interacting with the self-driving vehicle 100*b* may control the function of the self-driving vehicle 100*b* by monitoring a user got in the self-driving vehicle 100*b* or through an interaction with a user. For example, if it is determined that a driver is in a drowsiness state, the robot 100*a* may activate the self-driving function of the self-driving vehicle 100*b* or assist control of a driving unit of the self-driving vehicle 100*b*. Herein, the function of the self-driving vehicle 100*b* controlled by the robot 100*a* may include a function provided by a navigation system or audio system provided within the self-driving vehicle 100*b*, in addition to a self-driving function simply.

Alternatively, the robot 100*a* interacting with the self-driving vehicle 100*b* may provide information to the self-driving vehicle 100*b* or may assist a function outside the self-driving vehicle 100*b*. For example, the robot 100*a* may provide the self-driving vehicle 100*b* with traffic information including signal information, etc., as in a smart traffic light, and may automatically connect an electric charger to a filling inlet through an interaction with the self-driving vehicle 100*b* as in the automatic electric charger of an electric vehicle.

AI, Robot and XR to which the Present Disclosure is Applicable

The AI technology and the XR technology are applied to the robot 100*a*, and the robot 100*a* may be implemented as a guidance robot, a transport robot, a cleaning robot, a wearable robot, an entertainment robot, a pet robot, an unmanned aerial robot, a drone, etc.

The robot 100*a* to which the XR technology is applied may mean a robot that is a target of control/interaction within an XR image. In this case, the robot 100*a* is different from the XR device 100*c*, and they may operate in conjunction with each other.

If the robot 100*a* that is a target of control/interaction within the XR image obtains sensor information from sensors including a camera, the robot 100*a* or the XR device 100*c* may generate an XR image based on the sensor information, and the XR device 100*c* may output the generated XR image. Furthermore, the robot 100*a* may operate based on a control signal received through the XR device 100*c* or a user's interaction.

For example, a user may identify a corresponding XR image at time of the robot 100*a* remotely operating in conjunction through an external device such as the XR device 100*c*, may adjust a self-driving path of the robot 100*a* through an interaction, may control an operation or driving, or may identify information of a surrounding object.

AI, Self-Driving and XR to which the Present Disclosure is Applicable

The AI technology and the XR technology are applied to the self-driving vehicle 100*b*, and the self-driving vehicle 100*b* may be implemented as a mobile robot, a vehicle, an unmanned aerial vehicle, etc.

The self-driving vehicle 100*b* to which the XR technology is applied may mean a self-driving vehicle provided with a means for providing an XR image or a self-driving vehicle that is a target of control/interaction within the XR image. Particularly, the self-driving vehicle 100*b* that is the target of control/interaction within the XR image is different from the XR device 100*c*, and they may operate in conjunction with each other.

The self-driving vehicle 100*b* provided with the means for providing the XR image may obtain sensor information from sensors including a camera, and may output the XR image generated based on the obtained sensor information. For example, the self-driving vehicle 100*b* includes an HUD, and may provide a passenger with an XR object corresponding to a real object or an object within a screen by outputting an XR image.

In this case, when the XR object is output to the HUD, at least a part of the XR object may be output to overlap with a real object toward which a passenger's view is directed. On the other hand, when the XR object is output to a display included within the self-driving vehicle 100*b*, at least a part of the XR object may be output to overlap with an object within a screen. For example, the self-driving vehicle 100*b* may output XR objects corresponding to objects, such as a carriageway, other vehicles, a traffic light, a signpost, a two-wheeled vehicle, a pedestrian, and a building.

If the self-driving vehicle 100*b* that is a target of control/interaction within an XR image obtains sensor information from sensors including a camera, the self-driving vehicle 100*b* or the XR device 100*c* may create an XR image based on the sensor information, and the XR device 100*c* may output the created XR image. Furthermore, the self-driving vehicle 100*b* may operate based on a control signal received through an external device, such as the XR device 100*c*, or a user's interaction.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution or a clean-state structure of an existing mobile communication network structure.

The 5G system is defined as service-based, and the interaction between network functions (NFs) in architecture for the 5G system can be represented in two ways as follows.

Reference point representation: shows the interaction between NF services in NFs described by a point-to-point reference point (e.g., N11) between two NFs (e.g., AMF and SMF).

Service-based representation: network functions (e.g., AMF) within a control plane (CP) enable other authorized network functions to access their services. This representation also includes a point-to-point reference point, if necessary.

Overview of 3GPP System

FIG. 4 illustrates various reference points.

In an example of a network structure illustrated in FIG. 4, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions of security procedures, terminal-to-network session handling, idle terminal location management, etc.

The SGSN handles all packet data such as mobility management and authentication of the user for another 3GPP network (e.g., GPRS network).

The ePDG serves as a security node for an untrusted non-3GPP network (e.g., I-WLAN, WiFi hotspot, etc.).

As described with reference to FIG. 4, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 4. In addition to the example of Table 1, various reference points can exist depending on the network structure.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

S2a and S2b among the reference point illustrated in FIG. 4 correspond to non-3GPP interfaces. S2a is a reference point that provides the user plane with related control and mobility support between trusted non-3GPP access and the PDN GW. S2b is a reference point that provides the user plane with related control and mobility support between an ePDG and the PDN GW.

FIG. 5 is an exemplary diagram of common architecture of the E-UTRAN and the EPC.

The E-UTRAN system is an evolved system from the existing UTRAN system, and may be, for example, a 3GPP LTE/LTE-A system. Communication networks are widely placed to provide various communication services such as voice (e.g. voice over internet protocol (VoIP)) via IMS and packet data.

Referring to FIG. 5, an E-UMTS network includes an E-UTRAN, an EPC, and one or more UEs. The E-UTRAN is composed of eNBs that provide a control plane and a user plane protocol to the UE, and the eNBs are connected through an X2 interface.

An X2 user plane interface (X2-U) is defined between the eNBs. The X2-U interface provides non-guaranteed delivery of a user plane packet data unit (PDU). An X2 control plane interface (X2-CP) is defined between two neighboring eNBs. The X2-CP performs functions such as context delivery between eNBs, control of a user plane tunnel between a source eNB and a target eNB, delivery of handover-related messages, and uplink load management.

The eNB is connected to the terminal through a radio interface and to an evolved packet core (EPC) through an S1 interface.

An S1 user plane interface (S1-U) is defined between the eNB and the serving gateway (S-GW). An S1 control plane interface (S1-MME) is defined between the eNB and the mobility management entity (MME). The S1 interface performs an evolved packet system (EPS) bearer service management function, a non-access stratum (NAS) signaling transport function, network sharing, and an MME load balancing function. The S1 interface supports many-to-many-relation between the eNB and an MME/S-GW.

The MME can perform various functions, such as NAS signaling security, access stratum (AS) security control, core network (CN) inter-node (Inter-CN) signaling to support mobility between 3GPP access networks, idle mode UE reachability (including performance and control of paging retransmission), tracking area identity (TAI) management (for idle and active mode terminals), PDN GW and SGW selection, MME selection for handover in which MME is changed, SGSN selection for handover to 2G or 3G 3GPP access network, roaming, authentication, bearer management functions including dedicated bearer establishment, and supporting the transmission of public warning system (PWS) (including earthquake and tsunami warning system (ETWS) and commercial mobile alert system (CMAS)) messages.

FIG. 6 is an exemplary diagram illustrating architecture of a general E-UTRAN and EPC.

As shown in FIG. 6, the eNB may perform functions for routing to the gateway while the Radio Resource Control (RRC) connection is active, scheduling and transmitting of paging messages, scheduling and transmitting of broadcasting channel (BCH), dynamic allocation of resources in the uplink and downlink to the UE, configuration and provision for measurement of the eNB, radio bearer control, radio admission control, and connection mobility control. In the EPC, paging situation, LTE_IDLE state management, ciphering of the user plane, SAE bearer control, ciphering of NAS signaling and integrity protection functions may be performed.

Annex J of 3GPP TR 23.799 shows various architectures by combining 5G and 4G. An architecture using NR and NGC is disclosed in 3GPP TS 23.501.

FIG. 7 is an exemplary diagram illustrating a structure of a radio interface protocol in a control plane between a UE and an eNB, and FIG. 8 is an exemplary diagram illustrating the structure of a radio interface protocol in a user plane between a UE and an eNB.

The radio interface protocol is based on a 3GPP radio access network standard. The radio interface protocol is horizontally composed of a physical layer, a data link layer and a network layer, and is vertically divided into a user plane for data information transmission and a control plane for control signal delivery.

The protocol layers may be divided into an L1 (first layer), an L2 (second layer), and an L3 (third layer) based on the lower three layers of an open system interconnection (OSI) reference model widely known in a communication system.

In the following, each layer of the radio protocol of the control plane shown in FIG. 7 and the radio protocol of the user plane shown in FIG. 8 will be described.

The physical layer, that is, the first layer, provides information transfer service using a physical channel. The physical layer has been connected to a medium access control layer placed on the upper side through a transport channel. Data between the medium access control layer and the physical layer is transferred through the transport channel. Furthermore, data is transferred through a physical channel between different physical layers, that is, physical layers between the transmission side and the reception side.

The physical channel is composed of several subframes on a time axis and several subcarriers on a frequency axis. In this case, one subframe is composed of a plurality of OFDM symbols and a plurality of subcarriers on the time axis. One subframe is composed of a plurality of resource blocks. One resource block is composed of a plurality of OFDM symbols and a plurality of subcarriers. A transmission time interval (TTI), that is, a unit time during which data is transmitted, is 1 ms corresponding to 1 subframe.

The physical channels present in the physical layers on the transmission side and the reception side may be divided into a physical downlink shared channel (PDSCH) and a physical uplink shared channel (PUSCH), that is, data channels, and a physical downlink control channel (PDCCH), a physical control format indicator channel (PC-FICH), a physical Hybrid-ARQ indicator channel (PHICH), and a physical uplink control channel (PUCCH), that is, control channels, according to 3GPP LTE.

Several layers are present in the second layer. First, the medium access control (MAC) layer of the second layer functions to map various logical channels to various transport channels, and also acts as logical channel multiplexing for mapping several logical channels to one transport channel. The MAC layer has been connected to a RLC layer, that is, an upper layer, through a logical channel. The logical channel is basically divided into a control channel that transmits information of the control plane and a traffic channel that transmits information of the user plane, depending on the type of transmitted information.

The radio link control (RLC) layer of the second layer functions to adjust the size of data, received from an upper layer, through segmentation and concatenation so that the data is suitable for a lower layer to transmit the data in a radio interval.

The packet data convergence protocol (PDCP) layer of the second layer performs a header compression function for reducing the size of an IP packet header having a relatively large size and containing unnecessary control information in order to efficiently transmit the IP packet, such as IPv4 or IPv6, in a radio interval having a small bandwidth when transmitting the IP packet. Furthermore, in the LTE system, the PDCP layer also performs a security function, which is composed of ciphering for preventing third party data wiretapping and integrity protection for preventing a third party data manipulation.

The radio resource control (hereinafter abbreviated as an "RRC") layer located at the top of the third layer is defined in only the control plane, is related to a configuration, re-configuration and release of radio bearers (hereinafter abbreviated as "RB"), and is responsible for control of the logical channel, the transport channel and the physical channel. In this case, the RB means service provided by the second layer for data transfer between a UE and an E-UTRAN.

If an RRC connection is established between the RRC layer of a UE and the RRC layer of a radio network, the UE is in an RRC connected mode. If not, the UE is in an RRC idle state.

Hereinafter, the RRC state and RRC connection method of a UE is described. The RRC state means whether the RRC of the UE has been logically connected to the RRC of the E-UTRAN. A case where the RRC of the UE is connected to the RRC of the E-UTRAN is called the RRC_CONNECTED state. A case where the RRC of the UE is not connected to the RRC of the E-UTRAN is called the RRC_IDLE state. A UE in the RRC_CONNECTED state has an RRC connection, and thus an E-UTRAN may check the presence of the UE in a cell unit. Accordingly, the E-UTRAN may effectively control the UE. In contrast, an E-UTRAN cannot check the presence of a UE in the RRC_IDLE state. A core network manages the UE in a tracking area (TA) unit, that is, an area unit greater than a cell. That is, whether the UE in the RRC_IDLE state is present has only to be checked in an area unit greater than a cell. In order to receive common mobile communication service, such as voice or data, the corresponding UE needs to make a transition to the RRC_CONNECTED state. Each TA is identified based on a tracking area identity (TAD. A UE may configure a TAI through a tracking area code (TAC), that is, information broadcasted by a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer located over the RRC layer performs functions, such as session management and mobility management.

Below, the NAS layer shown in FIG. 7 will be described in detail.

An evolved session management (ESM) belonging to the NAS layer is responsible for control that enables a UE to use PS service from a network by performing functions, such as default bearer management and dedicated bearer management. A default bearer resource is characterized in that it is assigned by a specific packet data network (PDN) when the network is accessed upon first access to the network. In this case, the network assigns an IP address available for a UE so that the UE can use data service and assigns QoS of a default bearer. In LTE, two types of a bearer having a guaranteed bit rate (GBR) QoS characteristic that guarantees a specific bandwidth for data transmission/reception and a non-GBR bearer having the best effort QoS characteristic without guaranteeing a bandwidth are supported. In the case of a default bearer, a non-GBR bearer is assigned. In the case of a dedicated bearer, a bearer having a QoS characteristic of a GBR or non-GBR may be assigned.

A bearer assigned to a UE by a network is called an evolved packet service (EPS) bearer. When assigning the EPS bearer, the network assigns one ID. This is called an EPS bearer ID. One EPS bearer has QoS characteristics of a maximum bit rate (MBR) or/and a guaranteed bit rate (GBR).

FIG. 9 is a diagram illustrating architecture of a general NR-RAN.

Referring to FIG. 9, an NG-RAN node may be one of the following.

gNB providing NR user plane and control plane protocols towards the UE; or ng-eNB providing E-UTRA user plane and control plane protocols towards the UE.

The gNB and the ng-eNB are interconnected with each other by means of the Xn interface. The gNB and ng-eNB are also interconnected with the access and mobility management function (AMF) by means of the NG interface to 5GC, more specifically, by means of the NG-C interface, and are interconnected with the user plane function (UPF) by means of the NG-U interface (see 3GPP TS 23.501 [3]).

For reference, architecture and F1 interface for functional split are defined in 3GPP TS 38.401 [4].

FIG. 10 is an exemplary diagram illustrating functional separation between a general NG-RAN and 5GC.

Referring to FIG. 10, yellow boxes represent logical nodes and white boxes represent main functions.

The gNB and ng-eNB host the following functions.

Functions for Radio Resource Management: radio bearer control, radio admission control, connection mobility control, and dynamic allocation of resources to UEs in both uplink and downlink (scheduling);

IP header compression, encryption and integrity protection of data;

Selection of an AMF at IMT-2000 3GPP-UE attachment when no routing to an AMF can be determined from the information provided by the UE;

Routing of user plane data towards UPF(s);

Routing of control plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session management;

Support of network slicing;

QoS flow management and mapping to data radio bearers;

Support of UEs in RRC_INACTIVE state;

Distribution function for NAS messages;

Radio access network sharing;

Dual connectivity;

Tight interworking between NR and E-UTRA.

The AMF hosts the following main functions (see 3GPP TS 23.501 [3]).

NAS signalling termination;

NAS signalling security;

AS security control;

Inter CN node signalling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing;

SMF selection.

The UPF hosts the following main functions (see 3GPP TS 23.501 [3]).

Anchor point for intra-/inter-RAT mobility (when applicable);

External PDU session point of interconnect to data network;

Packet routing and forwarding;

Packet inspection and user plane part of policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping);

Downlink packet buffering and downlink data notification triggering.

The session management function (SMF) hosts the following main functions (see 3GPP TS 23.501 [3]).

Session management;

UE IP address allocation and management;

Selection and control of UP function;

Configure traffic steering at UPF to route traffic to proper destination;

Control part of policy enforcement and QoS;

Downlink data notification.

FIG. 11 illustrates an exemplary diagram of a general 5G architecture.

The following is a description of each reference interface and node in FIG. 11.

An access and mobility management function (AMF) supports functions of inter-CN node signaling for mobility between 3GPP access networks, termination of radio access network (RAN) CP interface N2, termination N1 of NAS signaling, registration management (registration area management), idle mode UE reachability, support of network slicing, SMF selection, and the like.

Some or all of the functions of the AMF can be supported in a single instance of one AMF.

A data network (DN) means, for example, operator services, internet access, or 3rd party service, etc. The DN transmits a downlink protocol data unit (PDU) to the UPF or receives the PDU transmitted from the UE from the UPF.

A policy control function (PCF) receives information about packet flow from an application server and provides functions of determining policies such as mobility management and session management.

A session management function (SMF) provides a session management function. If the UE has a plurality of sessions, the sessions can be respectively managed by different SMFs.

Some or all of the functions of the SMF can be supported in a single instance of one SMF.

A unified data management (UDM) stores subscription data of user, policy data, etc.

A user plane function (UPF) transmits the downlink PDU received from the DN to the UE via (R)AN and transmits the uplink PDU received from the UE to the DN via the (R)AN.

An application function (AF) interacts with 3GPP core network to provide services (e.g., to support functions of an application influence on traffic routing, network capability exposure access, interaction with policy framework for policy control, and the like).

A (radio) access network (R)AN collectively refers to a new radio access network supporting both evolved E-UTRA, that is an evolved version of 4G radio access technology, and a new radio (NR) access technology (e.g., gNB).

The gNB supports functions for radio resource management (i.e., radio bearer control, radio admission control, connection mobility control, and dynamic allocation of resources (i.e., scheduling) to the UE in uplink/downlink)

The UE means a user equipment.

In the 3GPP system, a conceptual link connecting between the NFs in a 5G system is defined as a reference point.

N1 is a reference point between the UE and the AMF, N2 is a reference point between the (R)AN and the AMF, N3 is a reference point between the (R)AN and the UPF, N4 is a reference point between the SMF and the UPF, N6 is a reference point between the UPF and the data network, N9 is a reference point between two core UPFs, N5 is a reference point between the PCF and the AF, N7 is a reference point between the SMF and the PCF, N24 is a reference point between the PCF in the visited network and the PCF in the home network, N8 is a reference point between the UDM and the AMF, N10 is a reference point between the UDM and the SMF, N11 is a reference point between the AMF and the SMF, N12 is a reference point between the AMF and an authentication server function (AUSF), N13 is a reference point between the UDM and the AUSF, N14 is a reference point between two AMFs, N15 is a reference point between the PCF and the AMF in case of non-roaming scenario, reference point between the PCF in the visited network and the AMF in case of roaming scenario, N16 is a reference point between two SMFs (reference point between the SMF in the visited network and the SMF in the home network in case of roaming scenario), N17 is a reference point between the AMF and 5G-equipment identity register (EIR), N18 is a reference point between the AMF and an unstructured data storage function (UDSF), N22 is a reference point between the AMF and a network slice selection function (NSSF), N23 is a reference point between the PCF and a network data analytics function (NWDAF), N24 is a reference point between the NSSF and the NWDAF, N27 is a reference point between a network repository function (NRF) in the visited network and the NRF in the home network, N31 is a reference point between NSSF in the visited network and NSSF in the home network, N32 is a reference point between security protection proxy (SEPP) in the visited network and SEPP in the home network, N33 is a reference point between a network exposure function (NEF) and the AF, N40 is a reference point between the SMF and a charging function (CHF), and N50 is a reference point between the AMF and a circuit bearer control function (CBCF).

Meanwhile, in FIG. 11, for convenience of description, a reference model for a case in which the UE accesses one DN using one PDU session is illustrated, but is not limited thereto.

In the following, for convenience of description, it is described based on the EPS system using an eNB, the eNB may be replaced with the 5G system using the gNB, the mobility management (MM) function of the MME may be replaced with the 5G system using the AMF, the SM function of S/P-GW may be replaced with the 5G system using the SMF, the user plane-related functions of the S/P-GW may be replaced with the 5G system using the UPF, etc.

In the above, the present disclosure has been described based on the EPS, but the content can be supported through similar operations through processes/messages/information for similar purposes in the 5G system.

As the mobile communication services have become an indispensable service in daily life, each mobile service provider is making various attempts to prevent interruption of services. For example, the mobile service providers use a plurality of wired networks in a core network duration in a wireless network or install a plurality of core networks such as AMFs/MMEs, and thus can prevent interruption of communication services by performing backup in other network node even if there is a problem in one network node.

However, in the event of a disaster such as a fire or an earthquake, the above measures may not be helpful. For example, this is because, in the event of a fire, all communication cables connected to the outside from one node of the wireless network may be lost. For example, in a virtualized cloud environment, the plurality of core networks such as AMFs/MMEs are highly likely to be implemented in one data center located in the same area. In addition, if this data center is located at a central point of the earthquake, there is a high possibility that all functions will be lost no matter how the plurality of AMFs/MMEs are implemented.

In this case, the most efficient way may use roaming. That is, if the UE cannot receive communication services since there is a problem in a network of a mobile service provider to which the UE subscribes, the UE can roam to a network of other surrounding mobile service provider and receive communication services. That is, each mobile service provider actively installs wireless networks and core networks in its licensed area. However, since different mobile service providers build networks in different buildings or in different ways, the disasters listed as examples in the preceding description may not have the same impact on all the mobile service providers. This is because a problem occurring in a mobile service provider is less likely to equally occur in other mobile service provider.

Each mobile service provider actively installs wireless networks and core networks in an area where he/she has obtained a license from an actual legal institution and obtained a business right, but cannot install the wireless/core networks in other areas because there is no business right. Hence, as so often, if any UE leaves an area or a country to which it subscribes, the UE receives roaming service over a network of other service provider. However, if the UE is located in the area or country to which it subscribes, the UE cannot receive the roaming service in the area due to a relationship between the mobile service providers competing with each other in the area.

Accordingly, if any UE attempts to access other surrounding networks due a problem occurring in a wireless network to which the UE subscribes, the other surrounding networks reject a registration since the UE is a UE of a competitor's communication network. In this instance, if the registration reject of the other communication networks notifies a PLMN restriction, the UE continuously considers the communication network as a restricted PLMN until the user directly intervenes, and does not attempt a service request. This causes a problem of degradation of user experience since the UE does not continuously perform a service access attempt even if the competitor's communication network and a subscribed communication network of the UE make an agreement and temporarily permit roaming.

Accordingly, when any UE cannot receive communication services from a communication network connected to the UE due to a problem occurring in the communication network, the present disclosure is to minimize interruption of communication service provision to the UE by efficiently managing PLMN restriction information managed by the UE in a process in which the UE efficiently moves to another communication network.

Embodiment 1

To this end, in the present disclosure, a network may inform UEs whether the network provides national roaming or emergency roaming or service of name or purpose similar to this. If the UEs are informed that this service can be provided, the UEs receiving this may check whether the UEs have been forbidden from accessing the network, or the network corresponds to an access forbidden PLMN. If it is determined that the network is a PLMN, that is previously forbidden from access, and corresponds to a target of national roaming or emergency roaming, the network may be removed from the forbidden PLMN list, and the UE may attempt to access the network.

FIG. 12 illustrates an embodiment to which the present disclosure is applicable.

Referring to FIG. 12, an embodiment to which the present disclosure is applicable is as follows.

A UE (HPLMN is system 1) registers to system 1 and gets service from the system 1, in S1200.

The UE detects a failure of the system 1, in S1201. More specifically, the UE can no longer get service from the system 1 for any reason. For example, the UE may periodically monitor whether the UE can get service from the system 1. Alternatively, the UE may receive a message notifying that the system 1 cannot provide normal service. This message may be received from the government or the network operator (e.g., system 1 operator), and may contain information about "disaster condition". The UE may generate configuration related to the failure of the system 1.

The UE starts to search other PLMN and selects a proper candidate (e.g., system 2), in S1202.

The UE camps on system 2 and then requests a registration, in S1203. For example, the UE may send the system 2 a registration request message.

The system 2 recognizes that the UE is a competitor's network (e.g., the UE is a UE of the same country and is not a subscriber of the system 2), and rejects a registration request of the UE, in S1204. For example, the system 2 may send the UE a registration reject message. In this process, the system 2 may inform that the system 2 is not a PLMN allowed to the UE by transmitting a proper cause value together with the registration reject message.

The UE manages the system 2 as a forbidden PLMN, or stores the system 2 as an access forbidden PLMN, in S1205.

When there is no other surrounding candidate PLMN, the UE camps on the system 2 and enters a limited service state, in S1206. For example, when there is no selectable network that is not included in the forbidden PLMN list, the UE may select the system 2. More specifically, the UE may perform an emergency call in the limited service state, or receive system information such as SIB.

The system 2 makes an emergency roaming agreement with the system 1, in S1207. Hence, the system 2 receives registration of UEs belonging to the system 1.

The system 2 provides the national/emergency roaming or service to the UE corresponding to the PLMN of the system 1, or transmits information of the purpose similar to this to the UEs, in S1208. For example, the UE recognizing that the system 2 supports the national/emergency roaming, etc. may exclude the system 2 from the forbidden PLMN list or the access forbidden network. Alternatively, the UE may perform the registration request to the system 2 even if the system 2 is present in the forbidden PLMN list.

The UE sends the system 2 the registration request message, in S1209.

The system 2 informs the UE of the successful registration and provides service to the UE, in S1210.

An example of UE operation according to the embodiment of FIG. 12 is as follows.

3.2.2.4 Mobile Station Reactions to Indications of Service Restriction from the Network Different types of UE behaviour are required to support national roaming, regionally provided service and temporary international roaming restrictions. The behaviour to be followed by the UE is indicated by the network.

3.2.2.4.1 "Permanent" PLMN Restriction

When a registration attempt by the UE is rejected by a network with an indication of "permanent" PLMN restriction, the PLMN identity shall be written to a list of "Forbidden PLMNs" stored in a data field in the SIM/USIM. If a successful registration is achieved on a PLMN in the "Forbidden PLMN" list, the PLMN shall be deleted from the list.

If a network indicates that the network support 'national/emergency roaming':

And if the network was in the 'Forbidden PLMN' list:

And if the PLMN of the network is of same country as the UE's HPLMN: the PLMN of the network shall be deleted from the list.

If a network (e.g., PLMN A) indicates the list of PLMNs (list K) that it supports for 'national/emergency' roaming:

And if the network (e.g., PLMN A) was in the 'Forbidden PLMN' list:

And if the list of PLMNs (list K) includes the UE's HPLMN: the PLMN of the network (PLMN A) shall be deleted from the list.

When in automatic mode, the UE may indicate any PLMNs which will not be selected due to their presence in the "Forbidden PLMN" list.

If a UE receives an equivalent PLMN list containing a PLMN which is included in the "Forbidden PLMN" list, this PLMN shall be removed from the equivalent PLMN list before this is stored by the UE.

3.2.2.4.2 "Partial" and "Temporary" PLMN Restrictions

When a registration attempt by the UE is rejected by a network due to a "partial" or a "temporary" PLMN restriction, the UE shall perform one of the following procedures determined by the indication in the location update reject cause sent by the network (see 3GPP TS 23.122 [3]):

i) The UE shall store the tracking area identity or location area identity in the list of "5GS forbidden TA, forbidden TAs or forbidden LAs for regional provision of service" respectively and shall enter the limited service state. The UE shall remain in that state until it moves to a cell in a location area where service is allowed.
ii) The UE shall store the tracking area identity or the location area identity in the list of "5GS forbidden TA, forbidden TAs or forbidden LAs for roaming" respectively and shall use one of the following procedures according to the PLMN selection Mode:
A) Automatic network selection mode: the procedure of 3.2.2.2. A).
B) Manual network selection mode: the procedure of 3.2.2.2. B).
iii) The UE shall store the tracking area identity or location area identity in the list of "5GS forbidden TA, forbidden TAs or forbidden LAs for roaming" respectively and shall search for a suitable cell in the same PLMN.
3.2 NOTE: A suitable cell will belong to a different TA or LA which is not in the "forbidden TAs or LAs for roaming".

When a TA supports multiple systems (e.g., 5GS and EPS), a cell of the TA may be a suitable cell for one system while the cell is not a suitable cell for other systems.

In the above process, PLMN list or forbidden PLMN list, forbidden TA list.

In the above process, a method of indicating information that any PLMN supports national/emergency roaming, or exclusion/update in the PLMN restriction is required is as follows (e.g., the step S1208).

That is, a list of PLMNs that support national/emergency roaming may be transmitted via SIB.

SIB1

SIB1 contains information relevant when evaluating if a UE is allowed to access a cell, and defines the scheduling of other system information. It also contains radio resource configuration information that is common for all UEs and barring information applied to the unified access control.

Signalling radio bearer: N/A
RLC-SAP: TM
Logical channel: BCCH
Direction: Network to UE
Table 2 is an example of the SIB1 message.

TABLE 2

```
ASN1START
TAG-SIB1-START
SIB1 ::=        SEQUENCE {
cellSelectionInfo           SEQUENCE {
q-RxLevMin                  Q-RxLevMin,
q-RxLevMinOffset                                INTEGER (1..8)
OPTIONAL,  -- Need R
q-RxLevMinSUL                                   Q-RxLevMin
OPTIONAL,  -- Need R
q-QualMin                                       Q-QualMin
OPTIONAL,  -- Need R
q-QualMinOffset                                 INTEGER (1..8)
OPTIONAL    -- Need R
}
OPTIONAL,  -- Need S
cellAccessRelatedInfo       CellAccessRelatedInfo,
connEstFailureControl                           ConnEstFailureControl
OPTIONAL,  -- Need R
si-SchedulingInfo                               SI-SchedulingInfo
OPTIONAL,  -- Need R
servingCellConfigCommon              ServingCellConfigCommonSIB
OPTIONAL,  -- Need R
ims-EmergencySupport                            ENUMERATED {true}
OPTIONAL,  -- Need R
eCallOverIMS-Support                            ENUMERATED {true}
OPTIONAL,  -- Cond Absent
UE-TimersAndConstants                           UE-TimersAndConstants
OPTIONAL,  -- Need R
NationalRoamingAllowed
AllowedPLMNforNationalRoaming
uac-BarringInfo             SEQUENCE {
uac-BarringForCommon                            UAC-BarringPerCatList
OPTIONAL,  -- Need S
uac-BarringPerPLMN-List             UAC-BarringPerPLMN-List
OPTIONAL,  -- Need S
uac-BarringInfoSetList      UAC-BarringInfoSetList,
uac-AccessCategory1-SelectionAssistanceInfo CHOICE {
plmnCommon
UAC-AccessCategory1-SelectionAssistanceInfo,
individualPLMNList              SEQUENCE (SIZE (2..maxPLMN)) OF
UAC-AccessCategory1-SelectionAssistanceInfo
}
OPTIONAL
}
OPTIONAL,  -- Need R
useFullResumeID                                 ENUMERATED {true}
OPTIONAL,  -- Need N
lateNonCriticalExtension                        OCTET STRING
OPTIONAL,
nonCriticalExtension                            SEQUENCE{ }
OPTIONAL
}
```

TABLE 2-continued

UAC-AccessCategory1-SelectionAssistanceInfo ::= ENUMERATED {a, b, c}
TAG-SIB1-STOP
-- ASN1STOP Table 3 is an example of SIB1 field descriptions.

TABLE 3

SIB1 field descriptions q-QualMin
Parameter "$Q_{qualmin}$" in TS 38.304 [20], applicable for serving cell. If the field is not present,
the UE applies the (default) value of negative infinity for $Q_{qualmin}$.
q-QualMinOffset
Parameter "$Q_{qualminoffset}$" in TS 38.304 [20]. Actual value $Q_{qualminoffset}$ = field value [dB]. If
cellSelectionInfo is not present or the field is not present, the UE applies the (default) value of
0 dB for $Q_{qualminoffset}$. Affects the minimum required quality level in the cell.
q-RxLevMin
Parameter "$Q_{rxlevmin}$" in TS 38.304 [20], applicable for serving cell.
q-RxLevMinOffset
Parameter "$Q_{rxlevminoffset}$" in TS 38.304 [20]. Actual value $Q_{rxlevminoffset}$ = field value * 2 [dB].
If absent, the UE applies the (default) value of 0 dB for $Q_{rxlevminoffset}$. Affects the minimum
required Rx level in the cell.
q-RxLevMinSUL
Parameter "$Q_{rxlevminSUL}$" in TS 38.304 [4], applicable for serving cell
uac-BarringForCommon
Common access control parameters for each access category. Common values are used for
all PLMNs, unless overwritten by the PLMN specific configuration provided in
uac-BarringPerPLMN-List. The parameters are specified by providing an index to the set
of configurations (uac-BarringInfoSetList). UE behaviour upon absence of this field is
specified in section 5.3.14.2.
useFull Resume ID
Indicates which resume identifier and Resume request message should be used. UE uses full
I-RNTI and RRCResumeRequest1 if the field is present, or short I-RNTI and
RRCResumeRequest if the field is absent.
uac-AccessCategory1-SelectionAssistanceInfo
Information used to determine whether Access Category 1 applies to the UE, as defined in
[25]. A UE compliant with this version of the specification shall ignore this field.
NationalRoamingAllowed
Indicates whether current network access from national roaming UEs.
AllowedPLMNforNationalRoaming
The list of PLMN whose subscribed are allowed for national roaming.

Embodiment 2

Through the process in the embodiment 1, a UE that gets services using a network of other communication operator in an area to which the UE subscribes shall rapidly return to a communication network to which the UE has originally subscribed, if the communication network of the UE is recovered. To this end, the present disclosure proposes the following method.

When a network that provides service to a UE of other communication operator for a reason such as emergency/national roaming no longer needs to provide the service to the UE, or in order for the network to indicate that the UE returns to its original communication operator, the network may send a de-registration request message or a message similar to this. If the UE that has got the national/emergency roaming service receives the above message from the network, the UE attempts to move and register to its original network.

8.2.14 De-Registration Request (UE Terminated De-Registration)

8.2.14.1 Message Definition

The De-registration request message is sent by the AMF to the UE. See the following Table 4.

Message type: DEREGISTRATION REQUEST

Significance: dual

Direction: Network to UE

Table 4 illustrates content of a DEREGISTRATION REQUEST message.

TABLE 4

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | De-registration request message identity | Message type 9.7 | M | V | 1 |
| | De-registration type | De-registration type 9.11.3.20 | M | V | ½ |

TABLE 4-continued

| IEI | Information Element | Type/Reference | Presence | Format | Length |
|---|---|---|---|---|---|
| | ReturnToHPMN End of emergency/ national roaming | Boolean | | | |
| | Spare half octet | Spare half octet 9.5 | M | V | ½ |
| 58 | 5GMM cause | 5GMM cause 9.11.3.2 | O | TV | 2 |
| 5F | T3346 value | GPRS timer 2 9.11.2.4 | O | TLV | 3 |

Alternatively, the de-registration type information is extended and may be used to transmit information of the similar purpose.

When SIB information, etc. have been updated in the network in which the UE stays, and national/emergency roaming is no longer supported to the updated SIB information, or when there is no HPLMN of the UE among from PLMNs supporting national/emergency roaming, the UE performs immediately the PLMN reselection, and preferentially checks whether its HPLMN is available. And then, if available, the UE attempts to access its HPLMN.

Preferably, in the above process, the UE may be based on PLMN codes. That is, when the UE accesses a PLMN with the same mobile country code (MCC) among its PLMN codes, the UE notifies registering to the PLMN for an emergency reason, and does not notify otherwise. Alternatively, additionally, specific PLMNs designated to a SIM card of the UE may be modified so that the operations are performed. Alternatively, additionally, each PLMN may be modified so that the operations are performed on UEs subscribed to a specific PLMN.

The present disclosure has been described based on HPLMN, but can be applied to cases other than HPLMN.

In the present disclosure, the UE may move to other network according to an indication in a wireless network of HPLMN, or the UE may move to other network when the UE cannot find a wireless network of HPLMN.

In the present disclosure, the UE and the network may use subscription information of the UE and identity codes of the network when determining national roaming, emergency roaming, or the process of the purpose equivalent to this. For example, if a mobile country code (MCC) of subscription information is 450 according to subscription information of any UE, the UE may exclude its home network. If a MCC of any network is 450, and the UE attempts to access this network, the UE may determine it as a national roaming process or an emergency roaming process. In addition, even when the UE has equivalent home PLMN (EHPLMN) information, the UE may determine similarly it. In addition, the UE may have information that which MCC is determined as home network by other configuration.

Embodiment 3

While UEs subscribing to a home network get services from other network due to a problem of the home network, the home network may perform a recovery process. Through this, if the home network is recovered, UEs getting service from other surrounding network shall perform a process of returning to the home network.

However, in this process, if other surrounding networks release the UE's connectivity at once, a large number of UEs may attempt to access the home network at the same time, thereby occurring a problem in the home network. Thus, in a process where the recovered home network accepts the UEs subscribed to it, a method capable of stably maintaining the operation is necessary.

FIG. 13 illustrates an embodiment to which the present disclosure is applicable.

Referring to FIG. 13, due to a problem occurring in a home network (hereinafter, referred to as A network or PLMN A), via other surrounding network (hereinafter, referred to as B network or PLMN B), for example, a subscriber of the A network may get communication services via the B network.

The subscriber of the A network may get a limited service via the B network, in S1301.

The A network determines that its failure has been recovered, in S1302.

In order for the A network to return again UEs, that have accessed the B network, to the A network, the A network requests the B network to release the subscriber of the A network, in S1303.

The B network receiving this request performs a release process on the subscriber of the A network, in S1304.

More specifically, if the problem occurring in the A network is solved, in order to re-arrange the subscribers that have been subscribed to the A network but get services from the B network, the A network may request the B network to return the subscribers of the A network.

In order to support this, if the A network serves again the subscriber, for example, HSS/UDM may check information for the subscriber of the A network, identify a UE that is configured to get service from the B network or a UE that has been registered to the B network, and transmit information for the UEs to the B network, for example, to MME/AMF. For example, the UDM/HSS of the A network may command the AMF/MME of the B network to de-attach or de-register the UEs belongings to the A network. The AMF/MME receiving this may disconnect UEs corresponding to the criteria.

More specifically, the A network may additionally transmit, to the B network, information that at which speed the B network disconnects the UE subscribing to the A network, or information that the B network shall send the A network how many UEs per unit time. The B network receiving this may use this information to determine whether it returns the UE subscribing to the A network to the A network or disconnects the UE subscribing to the A network, according to a rate or a speed indicated in this request.

In addition, the A network may transmit, to the B network, information that which UEs shall return preferentially to the A network. For example, the A network may present, to the B network, specific criteria, such as a UE in which there is no currently ongoing cell, or a UE that is currently in the idle mode. The B network may use this information to determine which UEs shall return preferentially to the A network.

In addition, in this process, the A network may transmit, to the B network, information that which UE shall be returned. For example, the A network may transmit, to the B network, information that the B network does not return a UE in which an emergency call is ongoing.

The A network may additionally transmit, to the B network, information that the UE of which area shall return to the A network. That is, if the recovery of the A network is performed on a per area basis, the B network can preferentially return the subscriber, who is in the recovered area, to its original network.

The B network receiving the information described above may operate according to the intention of the information.

In the above process, in order to return the UE, that is in the idle mode and subscribes to the A network, to the B network, the B network may transmit, to the UE, information related to this. For example, the B network may transmit, to the UE, information that notifies a termination of emergency roaming, or information that the corresponding cell or TA does not correspond to emergency roaming per cell or per TA.

If a UE receiving this has subscribed to the B network, the UE may still stay in the B network. If a UE receiving this has subscribed to the A network, the UE may terminate the camping on the B network after a time point at which the above information is received, search a cell belonging to the A network, and perform the registration process. In the process, for example, if the B network receives information similar to the number of UEs, per unit time, returning from the B network to the A network based on information received from the A network, the B network may inform the UE of this via SIB, etc. The UE of the A network receiving this may determine whether the UE shall immediately move to the A network, or shall move to the A network after a predetermined time based on the above information, and operate accordingly. For example, the UE may compare any number with the above value and determine this.

In the above process, while the B network may release RRC connection with a UE of the connected mode, at the same time, the B network may transmit, to the UE, information that the UE shall move to a specific PLMN (e.g., A network), and the UE receiving this may move to the A network.

Alternatively, while the B network terminates connection with a UE belonging to the A network, the B network may transmit, to the UE, commands such as RRC release or DEREGISTRATION command, and may inform the UE that emergency roaming has been terminated, or command the UE to move to a specific PLMN. The UE receiving this may move to the A network according to the command.

Embodiment 4

In the present disclosure, as mentioned above, if the B network provides roaming service to a UE of the A network, this service may be performed in a specific area at a specific time (e.g., emergency area and time at which emergency recovery is not performed).

However, according to an emergency recovery situation, a provision area of the roaming service may gradually decrease. Further, when the occurrence of the emergency situation itself is quickly communicated, the network may quickly determine whether to provide roaming to which area, based on this.

Accordingly, the present disclosure proposes an operation that allows the A network and the B network to dynamically exchange these information with each other.

To this end, for example, a network exposure function (NEF) may be used. That is, if an emergency situation occurs, the A network in which an emergency occurs identifies areas in which communication services are not performed, and a NEF or an AF of the A network or O&M server transmits information for this to a NEF of the B network. In this process, for example, information on service which wants to be provided, information of a server for checking subscriber information such as UDM/HSS, IMS call processing method or related server, or information of areas to require communication service support, and the like, may be transmitted.

Hence, the NEF may update configuration information to network nodes of the B network, and may command the B network to accept subscribers of the A network.

To this end, information exchange between PCFs may be used. That is, if an emergency situation occurs, the A network in which an emergency occurs may identify areas in which communication services are not performed, and transmit information for this to a PCF of the B network (or, via the NEF if necessary). In this process, for example, the A network may transmit information on service which wants to be provided, information of a server for checking subscriber information such as UDM/HSS, IMS call processing method or related server, or information of areas to require communication service support, and the like.

More specifically, the authorized 3rd party, for example, servers of public institutions of government agencies may be used instead of direct information exchange between the A network and the B network. That is, the A network does not directly provide information to the B network, and if the government agency grasps a problem of any communication network, the government agency may send the B network a command to take an action for accepting subscribers of the A network in a certain area.

The present disclosure can be applied to various communication systems such as 3G/4G/5G using the similar method.

FIG. 14 illustrates an embodiment of a UE to which the present disclosure is applicable.

Referring to FIG. 14, a UE checks a condition related to a connectivity state of the UE, in S1410. More specifically, the UE may check the condition related to the connectivity state of the UE by monitoring a connectivity state with a network. Alternatively, the UE may check the condition related to the connectivity state of the UE by receiving, from a searched network, information about the condition related to the connectivity state of the UE. For example, the information about the condition related to the connectivity state of the UE may be received from a network that has been previously connected to the UE. The condition related to the connectivity state of the UE may be related to an interruption or a failure of a service provided to the UE via the network that has been previously connected to the UE. The interruption or the failure of the service is generated due to a disaster related to a PLMN to which the UE has been connected or a disaster of an area in which the UE is located.

The UE selects a network included in a forbidden PLMN list based on the condition related to the connectivity state of the UE, in S1420. More specifically, the forbidden PLMN list is applicable to the condition related to the connectivity state of the UE, and may include a list of networks that can perform a registration request of the UE. In addition, in order for the UE to select the network, the UE may receive, from the network, information representing whether the network is applicable to the condition related to the connectivity state of the UE.

The UE sends a registration request message to the selected network, in S1430.

The UE receives, from the selected network, a response message as a response to the registration request message, S1440.

Overview of Devices to which the Present Disclosure can be Applied

FIG. 15 illustrates a block diagram of a communication device according to an embodiment of the present disclosure.

Referring to FIG. 15, a wireless communication system includes a network node 1510 and a plurality of UEs 1520.

The network node 1510 includes a processor 1511, a memory 1512, and a communication module 1513 (transceiver). The processor 1511 implements the functions, processes and/or methods proposed in FIGS. 1 to 14 above. Layers of wired/wireless interface protocol may be implemented by the processor 1511.

The memory 1512, being connected to the processor 1511, stores various information for driving the processor 1511. The communication module 1513 module, being connected to the processor 1511, transmits and/or receives wired/wireless signals. As an example of the network node 1510, a base station, AMF, SMF, UDF, etc. may correspond to this. In particular, when the network node 1510 is the base station, the communication module 1513 may include a radio frequency (RF) unit for transmitting/receiving a radio signal.

The UE 1520 includes a processor 1521, a memory 1522, and a communication module (or RF unit) 1523 (transceiver). The processor 1521 implements the functions, processes and/or methods proposed in FIGS. 1 to 14 above. Layers of a wireless interface protocol may be implemented by the processor 1521. In particular, the processor may include a NAS layer and an AS layer. The memory 1522, being connected to the processor 1521, stores various information for driving the processor 1521. The communication module 1523, being connected to the processor 1521, transmits and/or receives radio signals.

The memory 1512, 1522 may be inside or outside the processor 1511, 1521 and connected to the processor 1511, 1521 through various well-known means. In addition, the network node 1510 (in the case of a base station) and/or the UE 1520 may have a single antenna or multiple antennas.

FIG. 16 illustrates a block diagram of a communication device according to an embodiment of the present disclosure.

Particularly, FIG. 16 illustrates the UE of FIG. 15 above in more detail. The communication module shown in FIG. 15 includes an RF module (or RF unit) of FIG. 16. The processor shown in FIG. 15 corresponds to the processor (or digital signal processor (DSP) 1610) in FIG. 16. The memory shown in FIG. 15 corresponds to the memory 1630 of FIG. 16.

Referring to FIG. 16, the UE includes a processor (or digital signal processor (DSP)) 1610, an RF module (or RF unit) 1635, a power management module 1605, an antenna 1640, a battery 1655, a display 1615, a keypad 1620, a memory 1630, a subscriber identification module (SIM) card 1625 (which may be optional), a speaker 1645 and a microphone 1650. The UE may also include a single antenna or multiple antennas.

The processor 1610 may implement the functions, processes and/or methods proposed above. Layers of a wireless interface protocol may be implemented by the processor 1610.

The memory 1630 is connected to the processor 1610 and stores information related to operations of the processor 1610. The memory 1630 may be located inside or outside the processor 1610 and may be connected to the processor 1610 through various well-known means.

A user enters command information, such as a telephone number, for example, by pushing (or touching) buttons of the keypad 1620 or by voice activation using the microphone 1650. The processor 1610 receives the command information and processes to perform the appropriate function, such as to dial the telephone number. Operational data may be extracted from the SIM card 1625 or the memory 1630. Furthermore, the processor 1610 may display the command information or operational information on the display 1615 for the user's recognition and convenience.

The RF module 1635 is connected to the processor 1610 and transmits and/or receives an RF signal. The processor 1610 forwards the command information to the RF module 1635, to initiate communication, for example, to transmit radio signals comprising voice communication data. The RF module 1635 is comprised of a receiver and a transmitter for receiving and transmitting radio signals. The antenna 1640 functions to transmit and receive radio signals. Upon receiving the radio signals, the RF module 1635 may forward the signal for processing by the processor 1610 and convert the signal to baseband. The processed signals may be converted into audible or readable information output via the speaker 1645.

FIG. 17 illustrates an example of a structure of a radio interface protocol in a control plane between a UE and eNodeB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based on three lower layers of an open system interconnection (OSI) standard model that is well known in the art of communication systems.

The layers of the radio protocol in the control plane illustrated in FIG. 17 are described below.

The physical layer, the first layer, provides an information transfer service using a physical channel. The physical layer is connected to a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. One subframe consists of a plurality of symbols and a plurality of subcarriers on the time axis. One subframe consists of a plurality of resource blocks, and one resource block consists of a plurality of symbols and a plurality of subcarriers. A unit time, a transmission time interval (TTI), at which data is transmitted, is 1 ms corresponding to one subframe.

Physical channels existing in the physical layers of the transmission side and the reception side may be divided into, according to 3GPP LTE, a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels.

The PCFICH transmitted on a first OFDM symbol of a subframe carries a control format indicator (CFI) regarding the number of OFDM symbols used for transmission of control channels in the subframe (i.e., size of a control region). A wireless device first receives the CFI on the PCFICH and then monitors the PDCCH.

Unlike the PDCCH, the PCFICH is transmitted via a fixed PCFICH resource of the subframe without the use of blind decoding.

The PHICH carries positive acknowledgement (ACK)/negative acknowledgement (NACK) signal for uplink (UL) hybrid automatic repeat request (HARQ). The ACK/NACK signal for UL data on PUSCH transmitted by the wireless device is transmitted on the PHICH.

A physical broadcast channel (PBCH) is transmitted on first four OFDM symbols of a second slot of a first subframe of a radio frame. The PBCH carries system information essential for the wireless device to communicate with the base station, and system information transmitted on the PBCH is referred to as a master information block (MIB). Compared to this, system information transmitted on the PDSCH indicated by the PDCCH is referred to as a system information block (SIB).

The PDCCH may carry resource allocation and transport format of a downlink shared channel (DL-SCH), resource allocation information of an uplink shared channel (UL-SCH), paging information on a paging channel (PCH), system information on DL-SCH, resource allocation of an upper layer control message such as a random access response transmitted on PDSCH, a set of Tx power control commands on individual UEs within an arbitrary UE group, a Tx power control command, activation of a voice over internet protocol (VoIP), etc. A plurality of PDCCHs can be transmitted within a control region, and the UE can monitor the plurality of PDCCHs. The PDCCH is transmitted on aggregation of one or multiple consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined depending on a correlation between the number of CCEs and the coding rate provided by the CCEs.

Control information transmitted on PDCCH is referred to as downlink control information (DCI). The DCI may contain resource allocation of PDSCH (which is also referred to as DL grant), resource allocation of PUSCH (which is also referred to as UL grant), a set of Tx power control commands on individual UEs within an arbitrary UE group, and/or activation of a voice over internet protocol (VoIP).

There are several layers in the second layer. First, a medium access control (MAC) layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane, according to a type of transmitted information.

The radio link control (RLC) layer of the second layer segments and concatenate data received from the upper layer and adjusts a data size so that a lower layer is adapted to transmit data to a radio section. In order to guarantee various QoS required by each radio bearer (RB), the RLC layer provides three operation modes of a transparent mode (TM), an unacknowledged mode (UM) (non-response mode), and an acknowledged mode (AM) (or response mode). In particular, the AM RLC performs a retransmission function through an automatic repeat and request (ARQ) function for reliable data transmission.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. This allows only information, that is necessarily required in a header part of data, to be transmitted, thereby increasing transmission efficiency of the radio section. In the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC_IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. Examples of the cases may include a case where transmission of uplink data is necessary for a reason of an attempt of a user to make a phone call, etc., or transmission of a response message when receiving a paging signal from the E-UTRAN.

A non-access stratum (NAS) layer performs functions such as session management and mobility management.

The NAS layer illustrated in FIG. 17 is described in detail below.

The NAS layer is divided into a NAS entity for mobility management (MM) and a NAS entity for session management (SM).

1) The NAS entity for MM generally provides the following functions.

An NAS procedure related to the AMF includes the following.

Registration management and connection management procedure. The AMF supports the functions.

Secure NAS signal connection between the UE and the AMF (integrity protection, ciphering)

2) The NAS entity for SM performs session management between the UE and the SMF.

A SM signalling message is generated and processed in the UE and the NAS-SM layer of the SMF. The content of the SM signalling message is not interpreted by the AMF.

In case of SM signalling transmission,

The NAS entity for MM generates security header indicating NAS transmission of SM signalling, and a NAS-MM message deriving a method and location of sending the SM signalling message via additional information for the received NAS-MM.

Upon reception of SM signalling, the NAS entity for SM performs integrity check of the NAS-MM message, and derives a method and place of deriving the SM signalling message by interpreting additional information.

In FIG. 17, the RRC layer, the RLC layer, the MAC layer, and the PHY layer located below the NAS layer are collectively referred to as access stratum (AS) layer.

In the present disclosure, the wireless device may be a base station, a network node, a transmission terminal, a reception terminal, a radio device, a wireless communication device, a vehicle, a vehicle on which a self-driving function is mounted, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service in addition to the devices. For example, the drone may be a flight vehicle that flies by a wireless control signal without a person being on the flight vehicle. For example, the MTC device and the IoT device are devices that do not require a person's direct intervention or manipulation, and may include a smart meter, a vending machine, a thermometer, a smart bulb, a door lock or a variety of sensors. For example, the medical device may be a device used for the purpose of diagnosing, treating, reducing, handling or preventing a disease or a device used for the purpose of testing, substituting or modifying a structure or function, and may include equipment for medical treatment, a device for operation, a device for (external) diagnosis, a hearing aid or a device for a surgical procedure. For example, the security device is a device installed to prevent a possible danger and to maintain safety, and may be a camera, CCTV, or a blackbox. For example, the FinTech device is a device capable of providing financial services, such as mobile payment, and may include a payment device or point of sales (POS). For example, the climate/environment device may mean a device for monitoring or predicting a climate/environment.

The mobile terminal described in the present disclosure may include a mobile phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. Furthermore, the mobile terminal may be used to control at least one device in an Internet of Things (IoT) environment or a smart greenhouse.

However, a person skilled in the art will easily understand that the configuration according to the embodiments described in the present disclosure may be applied to stationary devices, such as digital TV, a desktop computer, and digital signage except a case where the configuration is applicable to mobile terminal.

The embodiments related to a control method which may be implemented in the mobile terminal configured as described above have been described with reference to the accompanying drawings. It is evident to those skilled in the art that the present disclosure may be materialized in another specific form without departing from the spirit and essential characteristics of the present disclosure.

The aforementioned embodiments of the present disclosure may be implemented through various means. For example, the embodiments of the present disclosure may be implemented by hardware, firmware or software, or a combination thereof.

In the case of an implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of an implementation by firmware or software, a method according to the embodiments of the present disclosure may be implemented in the form of a device, a procedure, or a function that performs the aforementioned functions or operations. A software code may be stored in the memory unit and executed by the processor. The memory unit may be positioned inside or outside the processor and may transmit and receive data to/from the processor by already various means The present disclosure may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, magnetic tapes, floppy disks, and optical data storages, and also include that the computer-readable medium is implemented in the form of carrier waves (e.g., transmission through the Internet). Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The communication method described above can be applied to various wireless communication systems including IEEE 802.16x and 802.11x systems, in addition to the 3GPP system. Furthermore, the proposed method can be applied to the mmWave communication system using ultra-high frequency bands.

The invention claimed is:

1. A method performed by a user equipment (UE) in a wireless communication system, the method comprising:
based on a disaster condition being applied, selecting a first public land mobile network (PLMN) in a forbidden PLMN list; and
performing a registration procedure on the first PLMN,
wherein the disaster condition is related to a service interruption from a second PLMN in a specific region, and
wherein the first PLMN is a PLMN offering disaster roaming services related to a minimization of the service interruption among PLMNs in the forbidden PLMN list.

2. The method of claim 1, further comprising:
receiving, from the first PLMN, information representing whether the first PLMN is applicable to the disaster condition.

3. The method of claim 1, wherein the first PLMN is selected based on that there is no available PLMN other than the PLMNs in the forbidden PLMN list.

4. The method of claim 1, wherein the performing the registration procedure on the first PLMN comprises:
transmitting, to an Access and Mobility management Function (AMF), a registration request message, and
receiving, from the AMF, a registration accept message.

5. The method of claim 1, wherein the second PLMN is a Home PLMN (HPLMN) to which the UE subscribes.

6. A user equipment (UE) configured to operate in a wireless communication system, the UE comprising:
a transceiver;
a processor configured to control the transceiver; and
a memory operably connected to the processor and storing instructions, when executed by the processor, which configure the processor to perform operations comprising:
based on a disaster condition being applied, selecting a first public land mobile network (PLMN) in a forbidden PLMN list; and
performing a registration procedure on the first PLMN,
wherein the disaster condition is related to a service interruption from a second PLMN in a specific region, and
wherein the first PLMN is a PLMN offering disaster roaming services related to a minimization of the service interruption among PLMNs in the forbidden PLMN list.

7. The UE of claim 6, wherein the first PLMN is selected based on that there is no available PLMN other than the PLMNs in the forbidden PLMN list.

8. The UE of claim 6, wherein the second PLMN is a Home PLMN (HPLMN) to which the UE subscribes.

* * * * *